US011195227B2

(12) United States Patent
Tufegdzic et al.

(10) Patent No.: US 11,195,227 B2
(45) Date of Patent: Dec. 7, 2021

(54) VISUAL SEARCH, DISCOVERY AND ATTRIBUTION METHOD, SYSTEM, AND COMPUTER PROGRAM PRODUCT

(71) Applicant: SAP SE, Walldorf (DE)

(72) Inventors: Sladana Tufegdzic, Munich (DE); Anja Wilbert, Munich (DE); Georg Kreimer, Munich (DE); Sebastian Mahr, Munich (DE)

(73) Assignee: SAP SE, Walldorf (DE)

( * ) Notice: Subject to any disclaimer, the term of this patent is extended or adjusted under 35 U.S.C. 154(b) by 32 days.

(21) Appl. No.: 16/720,355

(22) Filed: Dec. 19, 2019

(65) Prior Publication Data

US 2021/0110464 A1     Apr. 15, 2021

Related U.S. Application Data

(60) Provisional application No. 62/912,776, filed on Oct. 9, 2019.

(51) Int. Cl.
*G06Q 30/06* (2012.01)
*G06F 16/538* (2019.01)
(Continued)

(52) U.S. Cl.
CPC ....... *G06Q 30/0643* (2013.01); *G06F 16/532* (2019.01); *G06F 16/535* (2019.01);
(Continued)

(58) Field of Classification Search
CPC .... G06Q 30/0601–0643; G06F 16/532; G06F 16/535; G06F 16/538; G06F 16/583
See application file for complete search history.

(56) References Cited

U.S. PATENT DOCUMENTS 10,684,738 B1 * 6/2020 Sicora ............... G06F 16/435
2008/0082426 A1 * 4/2008 Gokturk ............... G06K 9/62
705/26.62
(Continued)

OTHER PUBLICATIONS

Nordstrom.com delivers website makeover to improve shopping experience for customers. (Aug. 29, 2000). Business Wire Retrieved from https://dialog.proquest.com/professional/docview/1050946372?accountid=131444.*

(Continued)

*Primary Examiner* — Resha Desai
(74) *Attorney, Agent, or Firm* — Fish & Richardson P.C.

(57) ABSTRACT

The present disclosure involves systems, software, and computer implemented methods for visual search, discovery, and attribution in e-commerce systems. One example method includes receiving an image to be used as a basis for a visual search. At least one clothing item in the image and a determined clothing type for each clothing item are identified. A highlighted image is generated that includes highlights of the identified at least one clothing item and determined clothing types. The highlighted image is provided. A selection of a selected clothing item on the highlighted image is received. In response to receiving the selection of the selected clothing item, a visual search is performed that includes searching a clothing item repository to find similar clothing items that are visually similar to the selected clothing item. Information for the similar clothing items is provided in response to the selection of the selected clothing item.

20 Claims, 26 Drawing Sheets

(51) Int. Cl.
*G06F 16/583* (2019.01)
*G06F 16/532* (2019.01)
*G06F 16/535* (2019.01)
*G06K 9/00* (2006.01)

(52) U.S. Cl.
CPC .......... *G06F 16/538* (2019.01); *G06F 16/583* (2019.01); *G06K 9/00671* (2013.01); *G06Q 30/0627* (2013.01); *G06Q 30/0629* (2013.01); *G06Q 30/0631* (2013.01)

(56) References Cited

U.S. PATENT DOCUMENTS

| | | | |
|---|---|---|---|
| 2011/0184780 A1* | 7/2011 | Alderson | G06Q 30/0203 705/7.32 |
| 2013/0083999 A1* | 4/2013 | Bhardwaj | G06K 9/4652 382/165 |
| 2013/0097181 A1* | 4/2013 | Sud | G06F 16/532 707/748 |
| 2017/0186066 A1* | 6/2017 | Bruch | G06Q 30/0623 |
| 2019/0081865 A1 | 3/2019 | Schrupp et al. | |
| 2019/0156077 A1 | 5/2019 | Wilbert et al. | |
| 2019/0318405 A1* | 10/2019 | Hu | G06F 16/55 |

OTHER PUBLICATIONS

U.S. Appl. No. 16/227,087, filed Dec. 20, 2018, Gregori et al.
SAP Customer Experience Labs[Online], "Fashion Labs" Jun. 8, 2018, [Retrieved on Nov. 26, 2019], retrieved from: URL <https://labs.cx.sap.com/2018/06/08/fashionlabs/>, 2 pages.
SAP Customer Experience Labs[Online], "Visual Search in SAP Hybris Commerce", Jun. 15, 2018, [Retrieved on Nov. 26, 2019], retrieved from: URL <https://labs.cx.sap.com/2018/06/15/visual-search-in-sap-hybris-commerce/>, 3 pages.
Fashion.Labs.Hybris.com[Online], "Fashion Labs", 2018, [Retrieved on Nov. 26, 2019], retrieved from: URL <https://fashion.labs.hybris.com/>, 2 pages.
SAP Customer Experience Labs [Online], "Video: FashionLabs Demo", Dec. 10, 2018, [Retrieved on Nov. 26, 2019] retrieved from: URL <https://cxlabs.sap.com/2018/12/10/video-fashionlabs-demo/>, 2 pages.
SAP Customer Experience Labs [Online], "Fashion Labs Influencer Dashboard", 2018, [Retrieved on Nov. 26, 2019], retrieved from: URL <https://fashion.labs.hybris.com/dashboard>, 1 pages.
SAP Customer Experience Labs [Online], "Fashion Labs", Oct. 19, 2018, [Retrieved on Nov. 26, 2019], retrieved from: URL <https://labs.cx.sap.com/prototype/fashionlabs/>, 2 pages.

* cited by examiner

VISUAL SEARCH, DISCOVERY AND ATTRIBUTION METHOD, SYSTEM, AND COMPUTER PROGRAM PRODUCT

TECHNICAL FIELD

The present disclosure relates to computer-implemented methods, software, and systems for visual search, discovery, and attribution in e-commerce systems.

BACKGROUND

A search system enables a user to enter search queries on a user device. The search system can receive the search query and perform a search to find documents that match the search query. The documents can be gathered as search results and provided to the user device. The user can select a particular search result link to view information about a corresponding search result.

SUMMARY

The present disclosure involves systems, software, and computer implemented methods for visual search, discovery, and attribution in e-commerce systems. An example method includes: receiving an image to be used as a basis for a visual search; identifying at least one clothing item in the image and a determined clothing type for each clothing item; generating a highlighted image that includes highlights of the identified at least one clothing item and determined clothing types; providing the highlighted image; receiving a selection of a selected clothing item on the highlighted image; in response to receiving the selection of the selected clothing item, performing a visual search, including searching a clothing item repository to find similar clothing items that are visually similar to the selected clothing item; and providing information for the similar clothing items in response to the selection of the selected clothing item.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
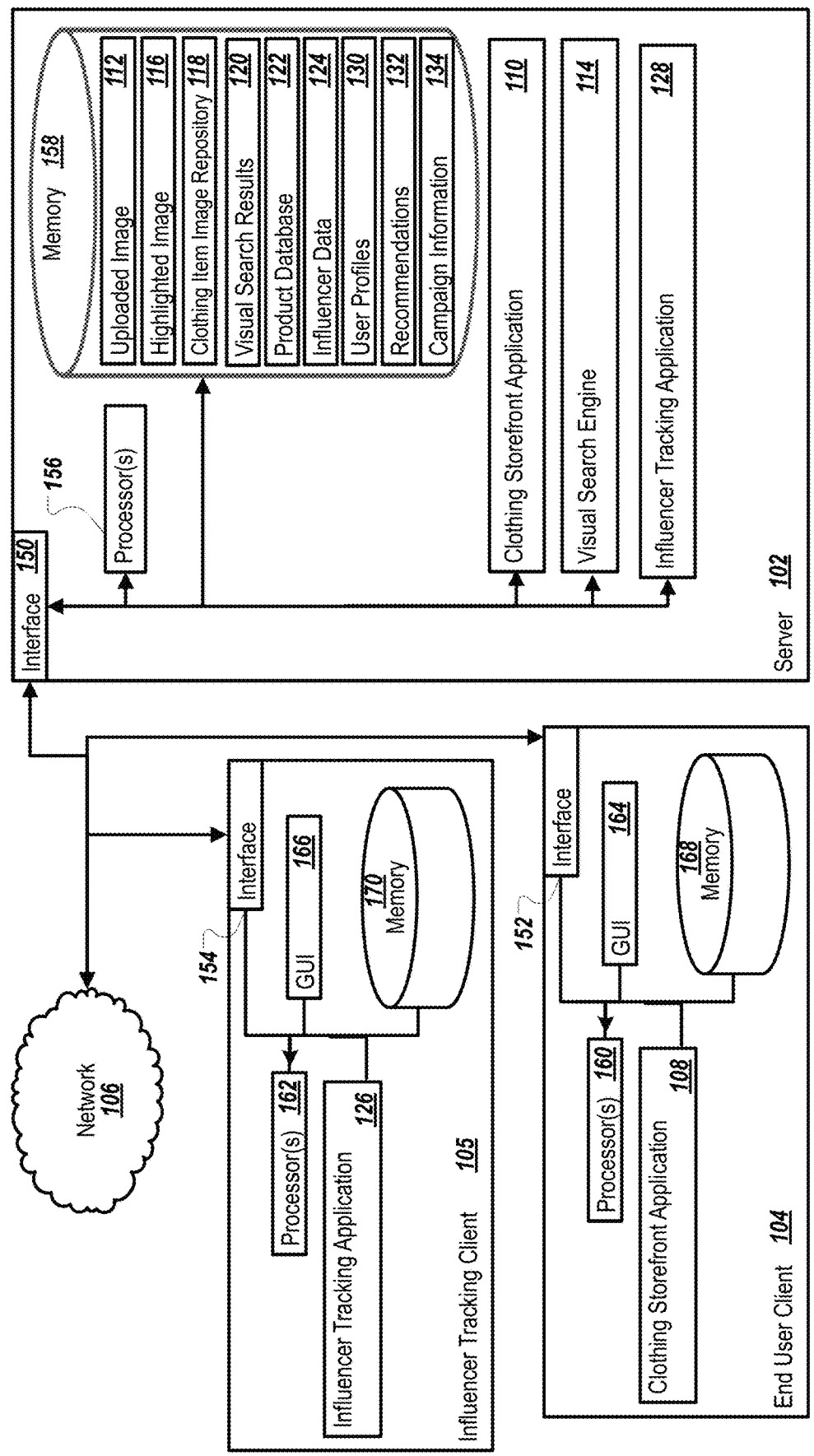
FIG. 1 is a block diagram illustrating an example system for visual search, discovery, and attribution in e-commerce systems.

Some systems provide mobile access for applications. However, existing systems often provide a same search interface as other, traditional systems, such as a keyword-input search system. Search support for products on some systems may be designed the same as for mobile devices as for traditional desktop devices, for example.

A visual search system can provide an end-consumer with an interface to search for products of interest by, for example, taking a picture right at the moment when they see something of interest. The visual search system can provide a solution for a challenge of properly describing an item of interest. Instead of typing in a search box and browsing a store, visually searching for similar products can be provided. A visual search feature can provide an alternative to a user entering a long list of keywords into a search box, which can be challenging.

The user can be supported in recreating a look that they saw on another person, on a mannequin, in an image (e.g., printed or digital), etc. A user may have an "I love that!

Where can I get it?" moment with regards to clothing items or other personal accessories. The user may be reading a magazine or walking down a street, and notice an outfit (e.g., on a display). The visual search system can leverage image recognition services to detect relevant fashion items like cloth, shoes and accessories from a picture taken by the customer.

The visual search system can be a standalone system or can be integrated into other systems. For example, the user can use a mobile site or mobile application provided by a brand. The user can use the mobile site or application to recreate a look (e.g., an outfit of certain items having certain characteristics) that they saw on another person or promoted by a brand, by using a visual search feature to find items that are visually similar to (e.g., having related or similar characteristics) an item(s) in an image that the user uploads.

The visual search system can provide various benefits and advantages to brands, marketers, and influencers. The system can provide a platform for influencers and marketers, for example. Search interactions on posted pictures can be analyzed, which can enable influencers and marketers to understand the performance of contributed posts, resulting purchases, demanded styles, trends, and users' fashion interests. The system can analyze user-provided images and styles and user-selected search results, rather than focusing on pre-configured images of styles that may or may not be of interest to particular users.

Brands and businesses can react to search patterns to build style books reflecting trending styles and most wanted items. Brands can leverage detailed knowledge about searched items to influence their supply chain and production, as well as to determine the next fashion trend. Influencers and affiliates can track and understand the amount of views and clicks on their content used by ecommerce websites.

In general, the system can provide various sales and marketing improvements. Analyzing a selected item in an image to identify product characteristics can result in more relevant search results. The system can enable improved individualized campaigns that are configured based on items the user has been searching for. The system can provide increased customer loyalty and increased cart value (e.g., more items purchased, due to more relevant search results). Use of the system can result in reduced shopping cart abandonment due to increased relevance of customer search results. By analyzing uploaded images, a brand can get an idea of styles, looks, and trends their customers are interested in, which can lead to brands learning a customer's style preferences. In turn, this customer-specific learning can result in more relevant search results and marketing campaigns, both on a specific customer level, as well as on a wider audience of similar customers. The system can use a customer experience suite to connect a demand chain with a supply chain. By leveraging context-driven services, marketers can analyze overall customer interaction, determine current trends, and curate sets/looks that are trending, which can increase shopping cart size and revenue for the brand.

Various features of the system can enable understanding of the impact of influencers. For example, the performance and effect of contributed posts and images from influencers can be tracked and analyzed. Brands can track and understand which influencers contributed the most to completed purchases, with that information being used in future campaigns and to identify the best influencers and advertisers to be used. Additionally, product development can be improved. For instance, the system can analyze a user-uploaded image and identify existing products that have some visually similar features to items in the uploaded image. The system can suggest variants of the existing product as new product creations based on a comparison of the existing product to items in the uploaded image.

In addition to benefiting brands, marketers, and influencers, the visual search system provides various benefits and advantages to users of the system. The visual search system provides customers a unique user interface to search fashion items on-the-go. For example, a user can search for items without using words to describe what they want. A visual-based search enables a user to search for items matching an image, without the user having to identify a right set of words that describe the image. The user may not know exactly what words to specify to find items that match the image, for example. By providing an image as a search basis, the user can search without typing or using filters or drill downs, which can be a more convenient method of searching. The system enables a WYSIWYG (What You See Is What You Get) image-based search, as compared to a keyword-based search.

The system provides an entertaining and fast way of searching, as compared to traditional keyword entry. Items that have a same color as a selected item in the image can be identified as search results, which can result in a closer color match as compared to a user entering in color words as textual keywords for a search. An application can enable both an image search and a keyword search, and search results from the image search can be presented in a same, consistent format as search results from a keyword search.

When the image includes multiple types of clothing, multiple product types (e.g., shirt, slacks, shoes) can be highlighted and a customer can select one to search for products that are visually similar to the selected item. Having multiple items recognized in an image can provide fast-track searching for multiple items that are included in an outfit in the image. The application can enable a user to search for multiple items in an entire look, rather than separately searching for individual items.

The visual search system can inspire users in a variety of ways. For example, the visual search system can inspire customers who know exactly what they are looking for. The system can support customers to recreate looks that they have otherwise discovered, for example. Additionally presenting and enabling searches for related looks from influencers can inspire customers and enable customers to view possible ways of wearing items that interest the customer.

Products can be proposed to the user based on the user's interactions, activity patterns and affinities. As another example, a user can use the application to add uploaded and/or selected items to a personalized style book. The system can create and provide individualized offers based on the contents of the personalized style book.

The visual search system can provide various technical advantages. For instance, a visual search can result in less consumption of client, network, and server resources, as compared to keyword-based approaches. For example, a visual search can result in a successful search after one search attempt, as compared to keyword-based searches which may involve multiple attempts as a user performs a trial and error session to attempt to determine a best set of multiple keywords to describe an item of interest. Visual searches can generally be more accurate, as far as matching item characteristics such as color and texture. Accordingly, users can generally submit less searches to a search system to receive relevant, accurate results, resulting in less resource consumption for the search system as a whole. As another example, a single visual search can correspond to searching for items that are visually similar to any of multiple items in an outfit. A corresponding keyword-based search for the multiple items would entail multiple searches, each with multiple keywords, which would result in an approach that would consume significantly more client, network, and server resources than the single visual search.

Additionally, wear and tear on client devices can generally be reduced with the visual search system. For instance, a visual search generally involves a smaller number of user inputs than keyword-based searches. For instance, a visual search can entail selecting an image and then requesting a visual search based on the image. A corresponding keyword-based search can entail entry of multiple character-based keywords, for each of multiple searches, as described above, along with a submission of a search request.

FIG. 1 is a block diagram illustrating an example system 100 for visual search, discovery, and attribution in e-commerce systems. Specifically, the illustrated system 100 includes or is communicably coupled with a server 102, an end-user client device 104, an influencer tracking client device 105, and a network 106. Although shown separately, in some implementations, functionality of two or more systems or servers may be provided by a single system or server. In some implementations, the functionality of one illustrated system, server, or component may be provided by multiple systems, servers, or components, respectively.

A user can use various features of a clothing storefront application 108 on the end-user client device 104. The clothing storefront application 108 can be a standalone application or can be a client-side version of a server clothing storefront application 110. The user can, for example, search for, browse, and purchase products by using the clothing storefront application 108. As another example, the user can use the clothing storefront application 108 to upload an uploaded image 112 to the server 102 to initiate a visual search process. The uploaded image 112 can include one or more items that interest the user, and the user can request a visual search to discover items that are similar to the item(s) of interest.

In response to receiving the uploaded image 112, a visual search engine 114 can identify at least one clothing item in the uploaded image 112 and generate a highlighted image 116 that includes highlights of the identified clothing item (s). Highlights can be selectable bounding boxes, for example. The highlighted image 116 can be provided to and displayed in the clothing storefront application 108. The user can select a particular highlight to continue the visual search process. An indication of the selected highlight (e.g., corresponding to an indication of a selected clothing item) can be provided to the visual search engine 114.

In response to receiving the selection of the selected clothing item, the visual search engine 114 can perform a visual search by searching a clothing item image repository 118 to find similar clothing items that are visually similar to the selected clothing item. The visual search engine 114 can generate visual search results 120 using the identified similar clothing items and product information for the identified similar clothing items (e.g., obtained from a product database 122). The visual search results 120 can be provided to and displayed in the clothing storefront application 108.

The visual search results 120 can be configured to be user-selectable, and a selection of a particular visual search result 120 can be provided to the server 102. In response to selection of a visual search result 120, product information for a product corresponding to the visual search result 120 can be obtained from the product database 122 and provided to the clothing storefront application 108 (e.g., in a product details page). The product details page can include other information, such as "related looks," which can be, for example, images of influencers (e.g., models) who are wearing clothing items that are similar to the product corresponding to the selected visual search result 120. The visual search engine 114 can identify the related look images, for example. The related look images can be processed to highlight included clothing items, and the user can select a clothing item on a related look image, to perform further visual searching.

Selections and purchases stemming from related look searches or interactions can be attributed to specific influencers and stored as influencer data 124. An influencer or other users (e.g., marketers, brand representatives, administrators) can use an influencer tracking application 126 (which can be a client-side version of a server influencer tracking application 128) to track and view metrics regarding influencer performance.

User selections, interactions, and purchases can be stored in user profiles 130. User preferences can be derived from the stored user profile information (and also stored in the user profiles 130). Recommendations 132 can be generated, based on the stored user preferences, and provided to and presented in the clothing storefront application 108. As another example, personalized campaigns can be configured (e.g., in campaign information 134) and performed. As yet another example, other campaigns can be configured based on overall trends determined from collective user interactions with the system.

As used in the present disclosure, the term "computer" is intended to encompass any suitable processing device. For example, although FIG. 1 illustrates a single server 102, a single end-user client device 104, and a single influencer tracking client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, and 154 are used by the server 102, the end-user client device 104, and the influencer tracking client device 105, respectively, for communicating with other systems in a distributed environment—including within the system 100—connected to the network 106. Generally, the interfaces 150, 152, and 154 each comprise logic encoded in software and/or hardware in a suitable combination and operable to communicate with the network 106. More specifically, the interfaces 150, 152, and 154 may each comprise software supporting one or more communication protocols associated with communications such that the network 106 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104 and the influencer tracking client device 105 may each generally be any computing device operable to connect to or communicate with the server 102 via the network 106 using a wireline or wireless connection. In general, the end-user client device 104 and the influencer tracking client device 105 each comprise an electronic computer device operable to receive, transmit, process, and store any appropriate data associated with the system 100 of FIG. 1. The end-user client device 104 and the influencer tracking client device 105 can each include one or more client applications, including the clothing storefront application 108 or the influencer tracking application 126, respectively. A client application is any type of application that allows the end-user client device 104 or the influencer tracking client device 105 to request and view content on a respective client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the influencer tracking client device 105 respectively include processor(s) 160 or processor(s) 162. Each processor 160 or 162 included in the end-user client device 104 or the influencer tracking client device 105 may be a central processing unit (CPU), an application specific integrated circuit (ASIC), a field-programmable gate array (FPGA), or another suitable component. Generally, each processor 160 or 162 included in the end-user client device 104 or the influencer tracking client device 105 executes instructions and manipulates data to perform the operations of the end-user client device 104 or the influencer tracking client device 105, respectively. Specifically, each processor 160 or 162 included in the end-user client device 104 or the influencer tracking client device 105 executes the functionality required to send requests to the server 102 and to receive and process responses from the server 102.

The end-user client device 104 and the influencer tracking client device 105 are each generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the influencer tracking client device 105 may comprise a computer that includes an input device, such as a keypad, touch screen, or other device that can accept user information, and an output device that conveys information associated with the operation of the server 102, or the respective client device itself, including digital data, visual information, or the GUI 164 or a GUI 166, respectively.

The GUIs 164 and 166 interface with at least a portion of the system 100 for any suitable purpose, including generating a visual representation of the clothing storefront application 108 or the influencer tracking application 126, respectively. In particular, the GUI 164 and/or the GUI 166 may be used to view and navigate various Web pages. Generally, the GUI 164 and the GUI 166 provide a respective user with an efficient and user-friendly presentation of business data provided by or communicated within the system. The GUI 164 and the GUI 166 may each comprise a plurality of customizable frames or views having interactive fields, pull-down lists, and buttons operated by the user. The GUI 164 and the GUI 166 each contemplate any suitable graphical user interface, such as a combination of a generic web browser, intelligent engine, and command line interface (CLI) that processes information and efficiently presents the results to the user visually.

Memory 168 and memory 170 included in the end-user client device 104 or the influencer tracking client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memory 168 and the memory 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104 and/or influencer tracking client devices 105 associated with, or external to, the system 100. For example, while the illustrated system 100 includes one end-user client device 104, alternative implementations of the system 100 may include multiple end-user client devices 104 communicably coupled to the server 102 and/or the network 106, or any other number suitable to the purposes of the system 100.

Additionally, there may also be one or more additional end-user client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the end-user client device 104 and the influencer tracking client device 105 may be described in terms of being used by a single user, this disclosure contemplates that many users may use one computer, or that one user may use multiple computers.

Figure 2:
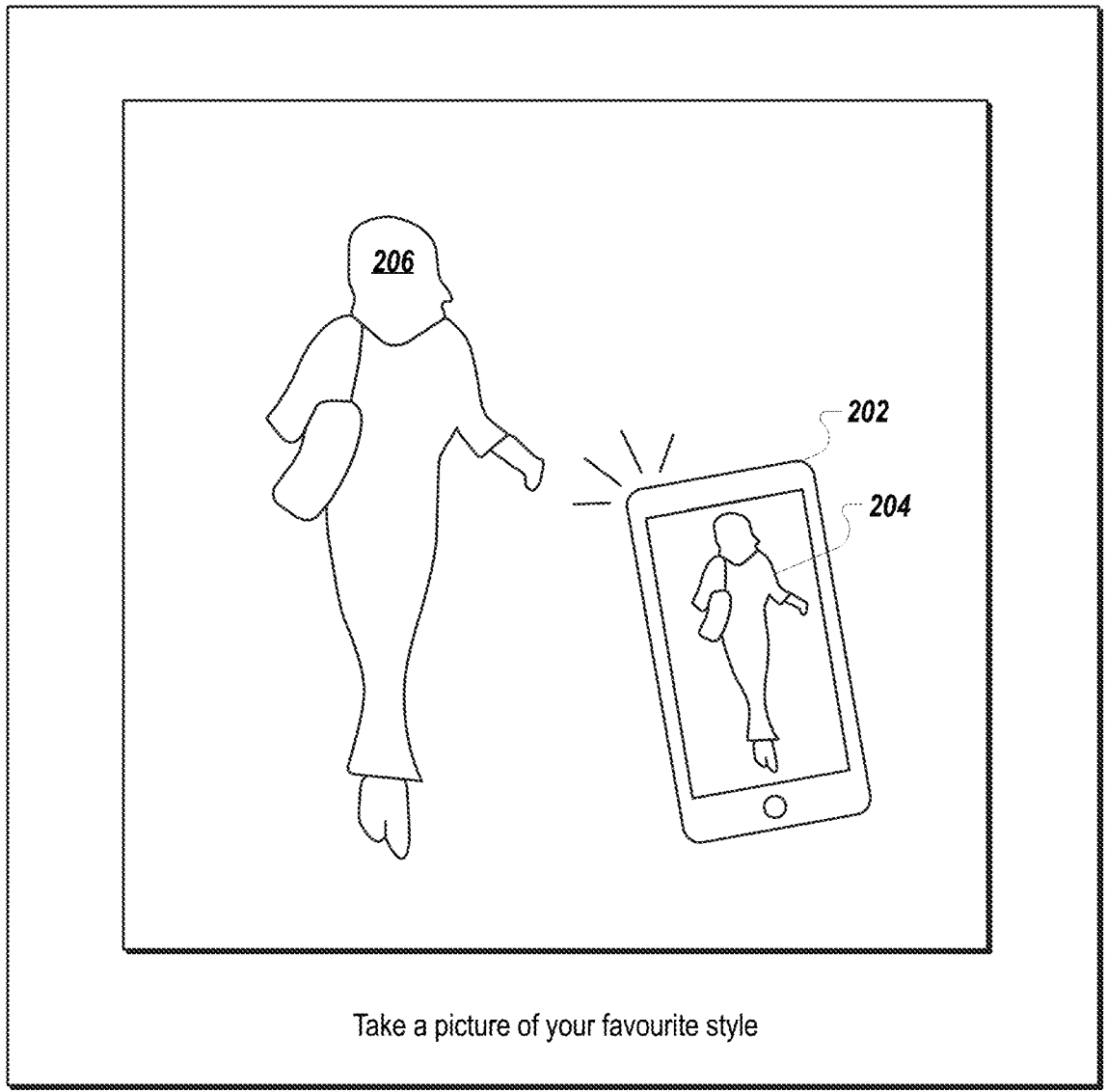
FIG. 2 is a conceptual diagram that illustrates capturing an image of a desired style.

FIG. 2 is a conceptual diagram 200 that illustrates capturing an image of a desired style. A user can capture an image that includes clothing items that create a style that the user is interested in. For example, the user can use a mobile device 202 to capture an image 204 of an object 206 that has clothing items that create a desired style. The object 206 can be a person, a mannequin, a set of clothing items (e.g., on a table), a poster or other image, or an image on a display device, to name a few examples.

Figure 3A:
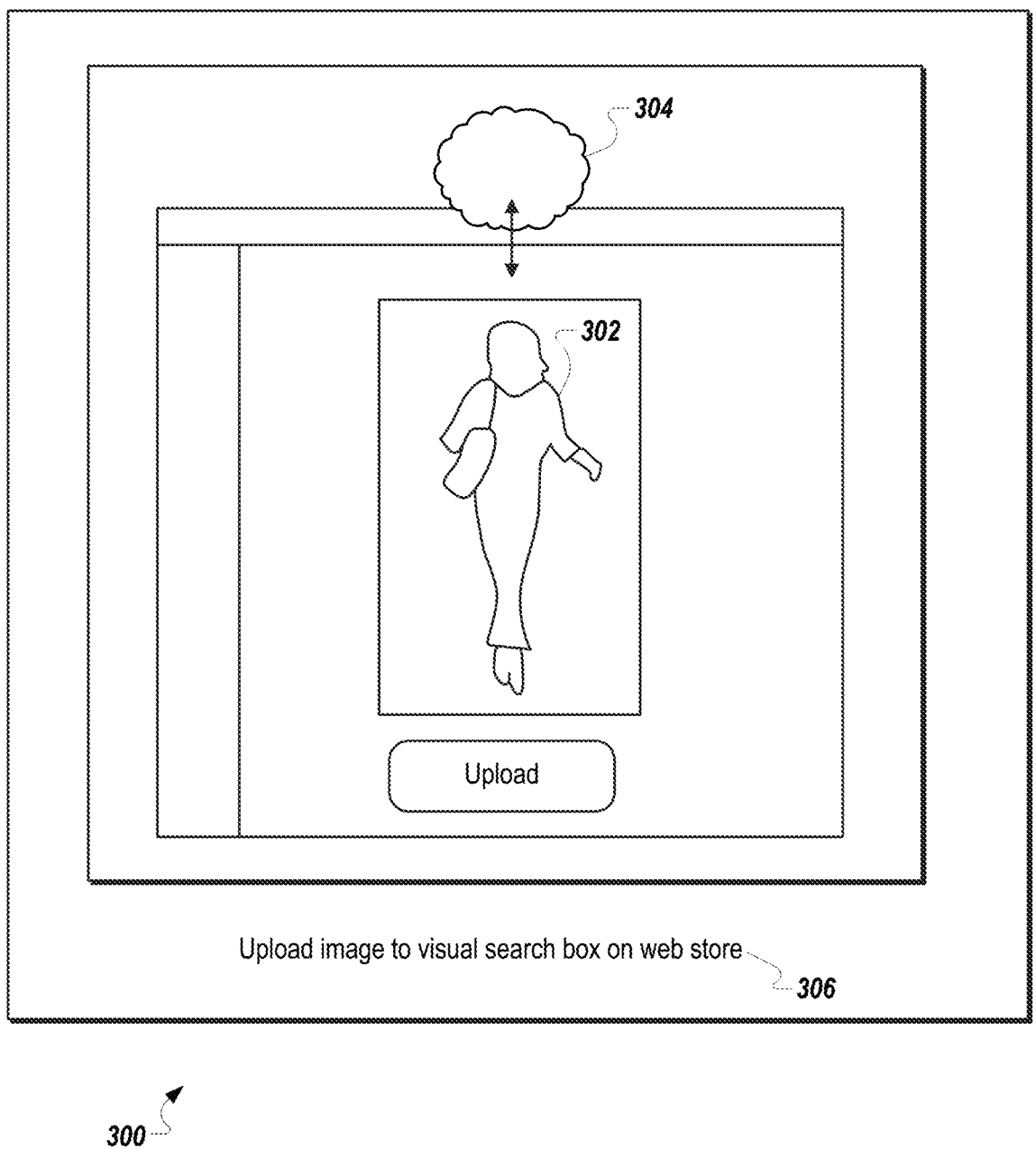
FIG. 3A is a conceptual diagram that illustrates uploading a captured image.

FIG. 3A is a conceptual diagram 300 that illustrates uploading a captured image. A user can upload a captured image 302, over a network 304, to a server, for example. As indicated by a note 306, the server can provide a visual search service, as part of a web store, for example.

Figure 3B:
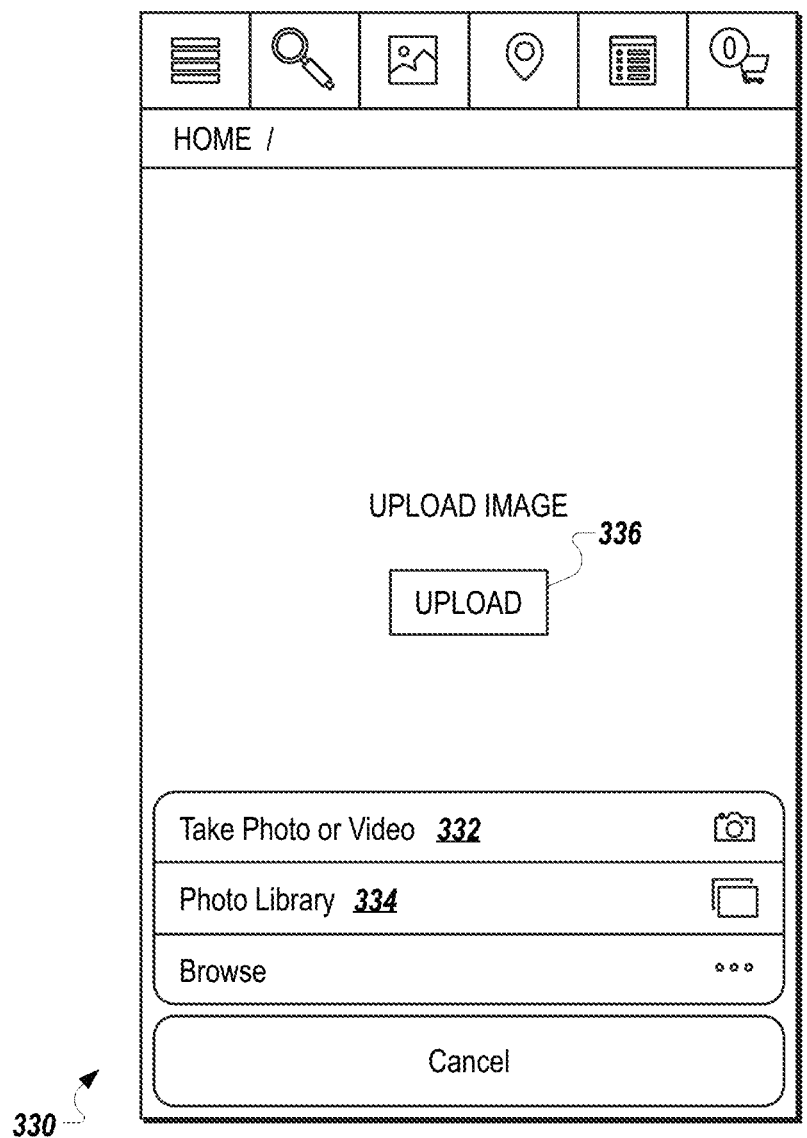
FIG. 3B illustrates an example user interface for uploading a captured image.

FIG. 3B illustrates an example user interface 330 for uploading a captured image. The user can select an previously captured image from a photo library 332, for example. As another example, the user can dynamically captured an image, by selecting a captured photo or video item 334, as part of an upload process. Once an image is captured or selected, the user can select an upload user interface control 336, to upload the image to a server.

Figure 3C:
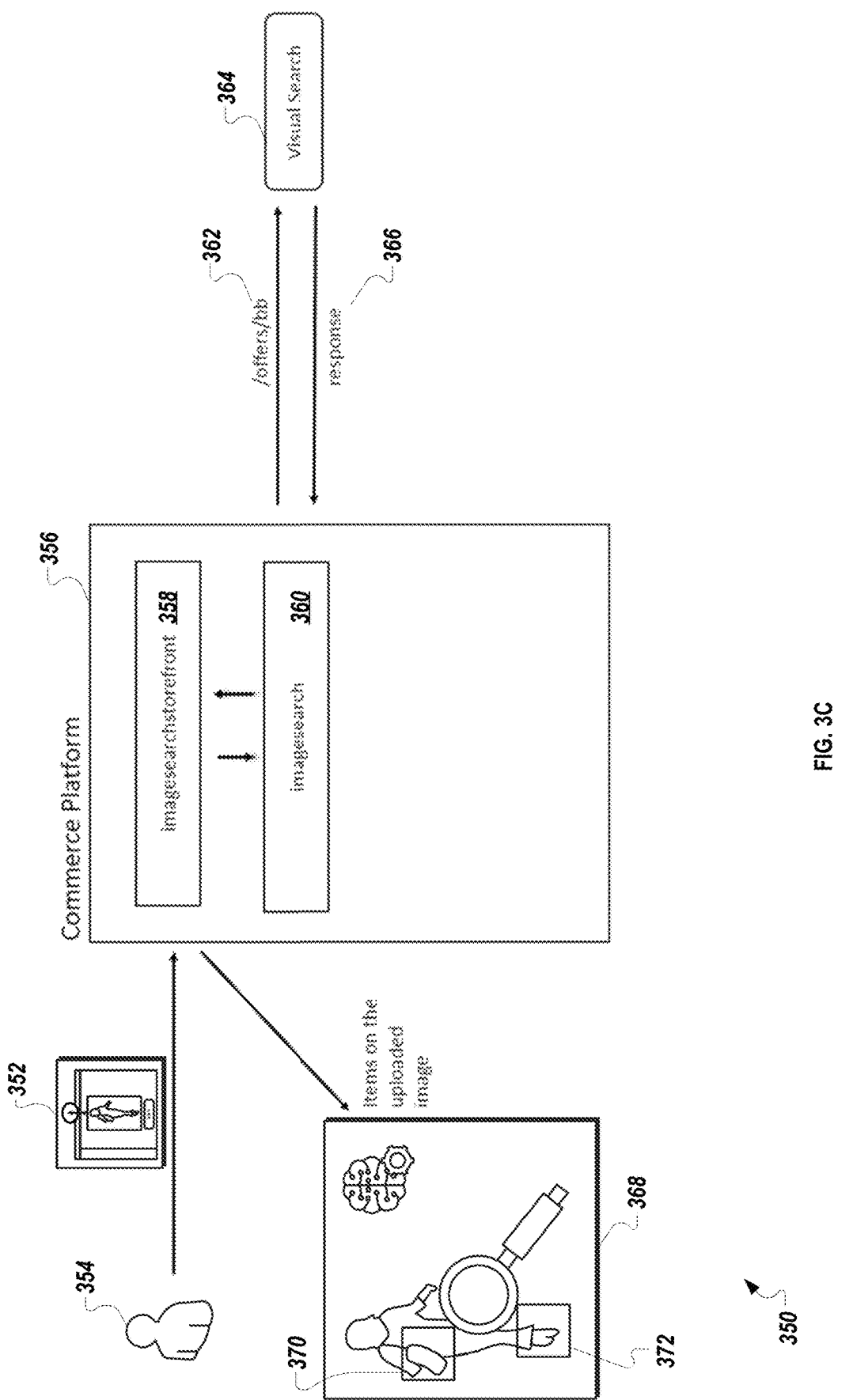
FIG. 3C illustrates an example system for uploading a captured image.

FIG. 3C illustrates an example system 350 for uploading a captured image. As illustrated by a conceptual image 352, a user 354 can upload an image to a commerce platform server 356 using, for example, an upload feature provided by an image search storefront service 358. The image search storefront service 358 can provide the uploaded image to an image search component 360. The image search component 360 can search for items in the image, or, as illustrated, can send a request 362 to a third party visual search engine 364.

The visual search engine 364 can search for clothing items within the image and send a response 366 that indicates clothing items included in the image. The response 466 can include tags (e.g. yellow skirt, red slacks), coordinates for bounding boxes of identified items, and links to similar products. The visual search engine 364 can identify multiple clothing items within the image, and can return information for multiple identified clothing items, such as when the image is an image of an outfit or of a person wearing multiple items, among other instances.

The image search component 360 can use information in the response to generate a user interface 368 that has indications (e.g., bounding boxes 370 and 372) of clothing items that were identified within the image. The bounding boxes 370 and 372 can be configured to be user-selectable. The image search component 360 can provide the generated user interface 368 to the image storefront service 358, and the image storefront service 358 can provide the user interface 368 to a device of the user 354, for presentation on the device.

As another example, rather than generating the user interface 368, the image search component 360 can forward the response 366 to the image storefront service 358, and the image storefront service 358 can generate the user interface 368 (and provide the user interface 368 to the device of the user 354). Although a visual search engine 364 is described, which may be external to the commerce platform 356, other approaches can be used. For example, the visual search engine 364 can be included in the commerce platform 356. As another example, a neural network or other machine learning model can be used, that is trained to identify type and location of clothing items within an image. The machine learning model can be part of the commerce platform 356 or may be external to the commerce platform 356 and used by another entity.

Figure 4A:
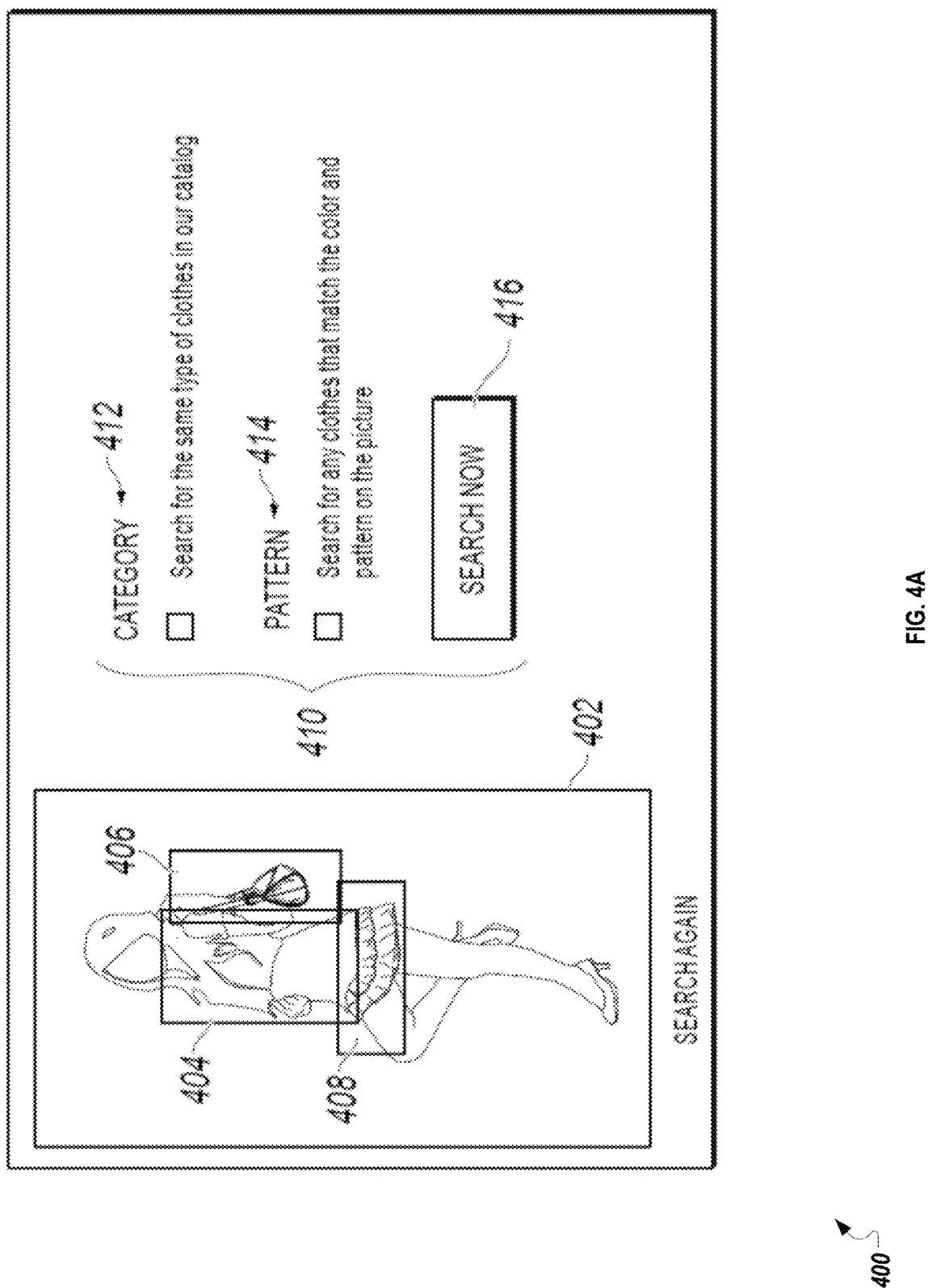
FIG. 4A illustrates an example user interface for displaying clothing items identified in an image.

FIG. 4A illustrates an example user interface 400 for displaying clothing items identified in an image. A highlighted image 402 includes bounding boxes 404, 406, and 408 for an identified shirt, purse, and shorts, respectively. The user can select one of the bounding boxes 404, 406, or 408, to perform a visual search based on a corresponding shirt, purse, or shorts clothing item, respectively. A search options area 410 includes a category option 412 that a user can select to tailor a search to search for items that are of a same type (e.g., general category, such as a shirts category) as an item in a selected bounding box. A pattern option 414 can be selected to tailor the search to search for any clothes that match a color and pattern of an item in a selected bounding box. A search can be requested in response to selection of a search control 416.

Figure 4B:
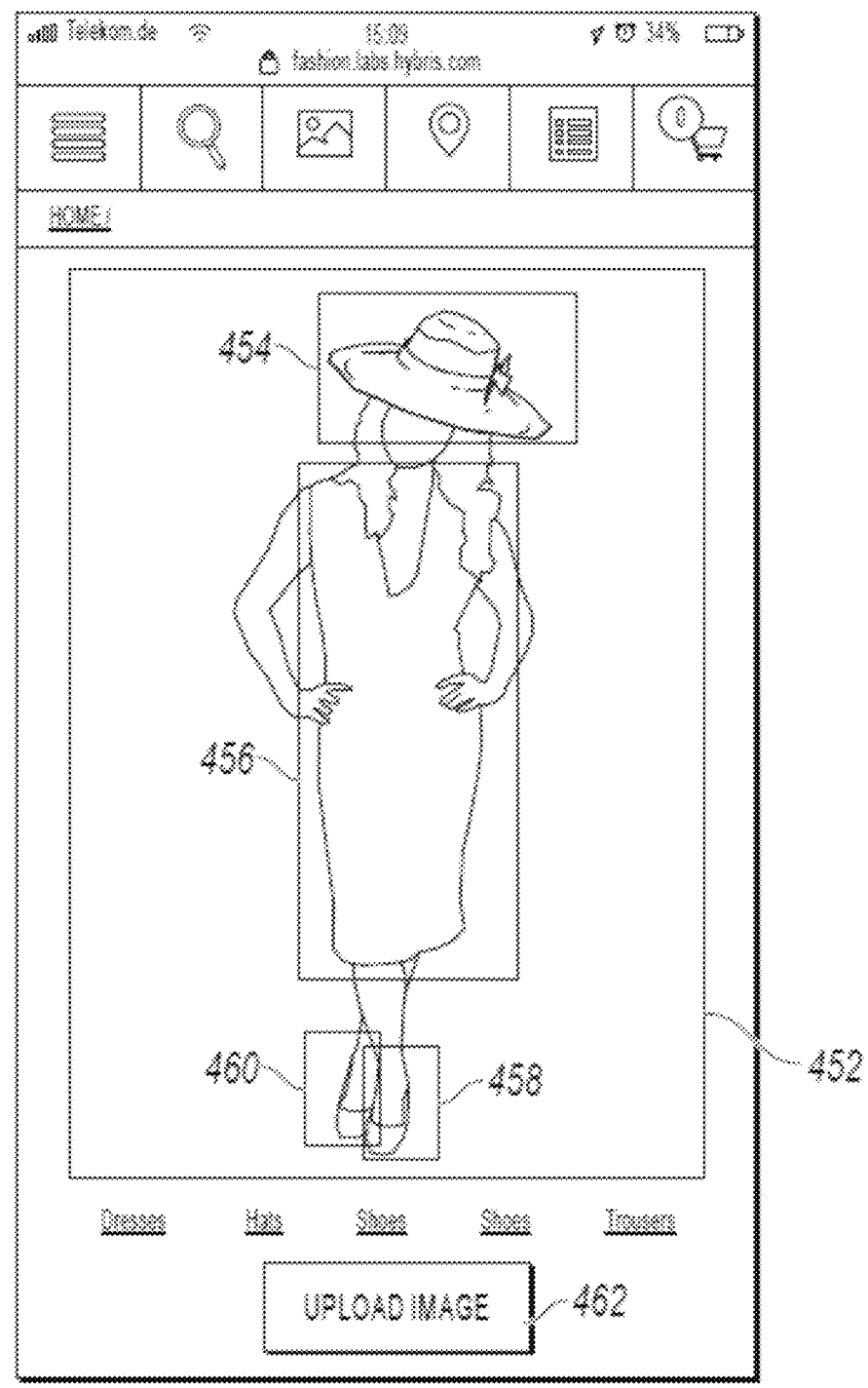
FIG. 4B illustrates another example user interface for displaying clothing items identified in an image.

FIG. 4B illustrates another example user interface 450 for displaying clothing items identified in an image. A highlighted image 452 includes an image of a mannequin and also includes bounding boxes 454, 456, 458, and 460 for an identified hat, dress, right shoe, and left shoe, respectively, that have been identified in an uploaded image (e.g., an image uploaded in response to selection of an upload user interface control 462). The user can select one of the bounding boxes 454, 456, 458, or 460 to perform a visual search based on a corresponding clothing item included in the selected bounding box.

Different approaches can be used to initiate a visual search. For example, a search button can be selected (although not shown in this example). As another example, a user can select a bounding box with a first input (e.g., a first tap or first click). Once a bounding box has been selected, a visual search based on a clothing item included in the selected bounding box can be initiated by re-selecting the bounding box (e.g., with a second user input, such as a second tap or second click). Similarly, a double-tap or double-click input can serve a same purpose, of selecting a bounding box and initiating a visual search based on the clothing item included in the selected bounding box. In some implementations, a visual search is performed in response to a first selection of an item (or bounding box).

Figure 5A:
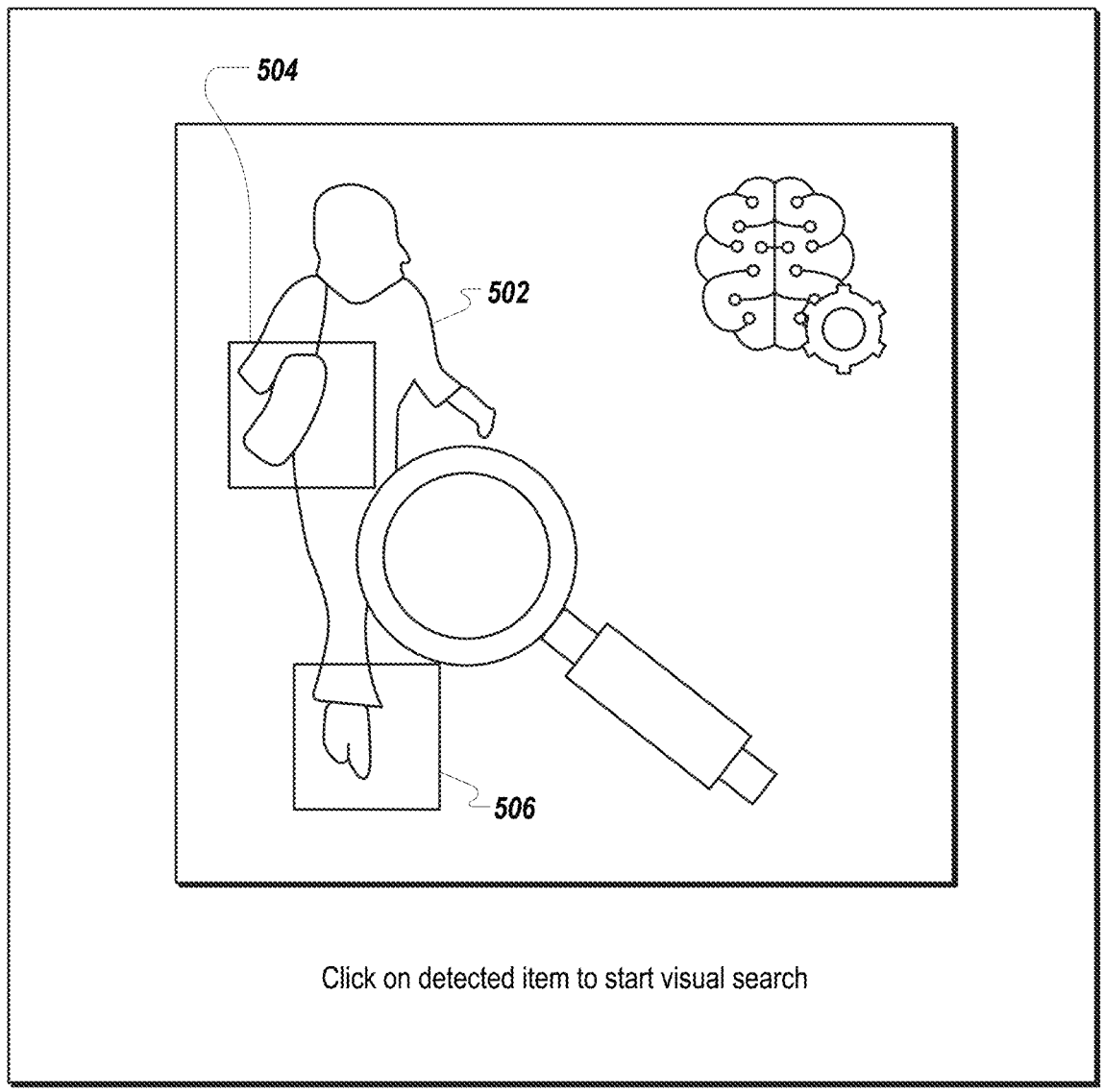
FIG. 5A is a conceptual diagram illustrating selection of an identified item to initiate a visual search based on the selected item.

FIG. 5A is a conceptual diagram 500 illustrating selection of an identified item to initiate a visual search based on the selected item. Once clothing items have been identified in an uploaded image, a user can select a particular item to initiate a visual search based on the selected item. For example, a highlighted image 502 includes two identified items 504 and 506 (e.g., illustrated at bounding boxes and corresponding to an identified purse and identified shoes, respectively). The user, in this example, has selected the identified item 504, to request a visual search based on the identified purse.

Figure 5B:
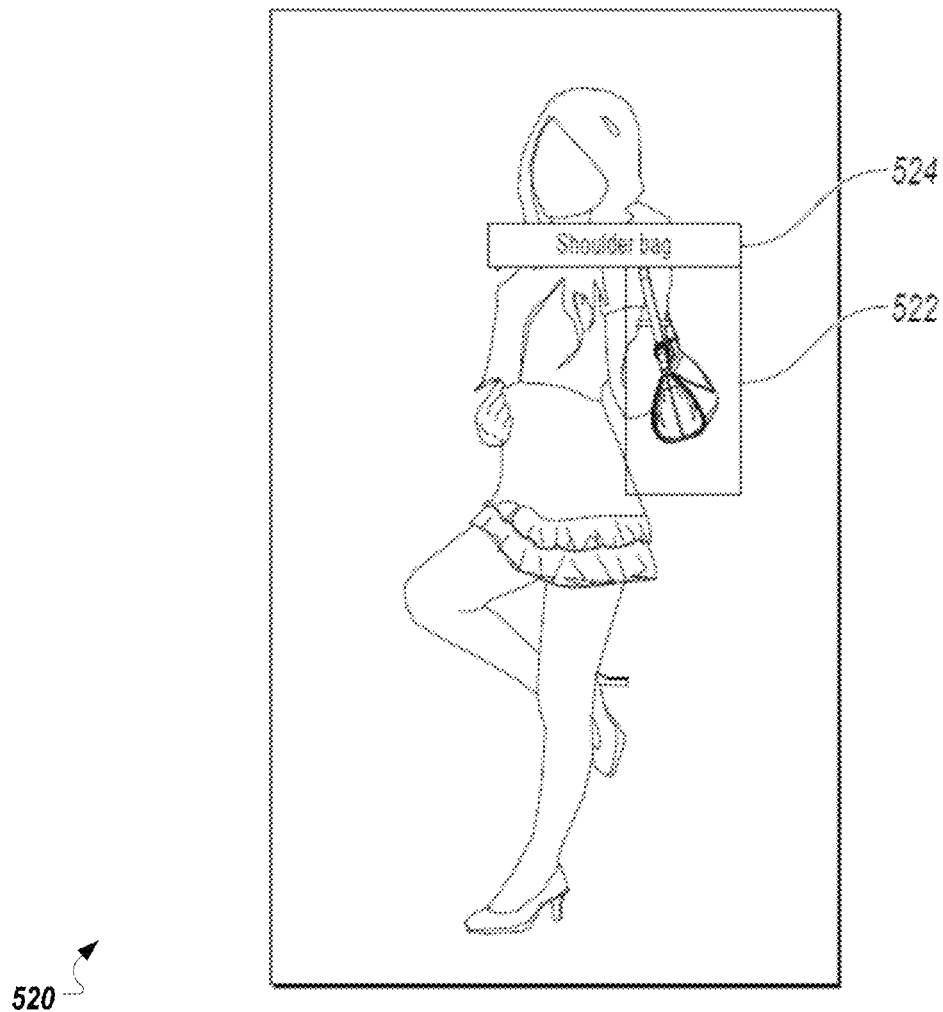
FIG. 5B illustrates an example user interface for initiating a visual search based on a selected clothing item.

FIG. 5B illustrates an example user interface 520 for initiating a visual search based on a selected clothing item. The user has selected a bounding box 522 (e.g., corresponding to the bounding box 406 of FIG. 4A) from among multiple bounding boxes that were previously displayed that each included an identified clothing item. A note 524 indicates an article type of the purse included in the bounding box 522. In response to selection of the bounding box 522 (or in response to a separate search-request input), a visual search can be requested based on the purse included in the bounding box 522.

Figure 5C:
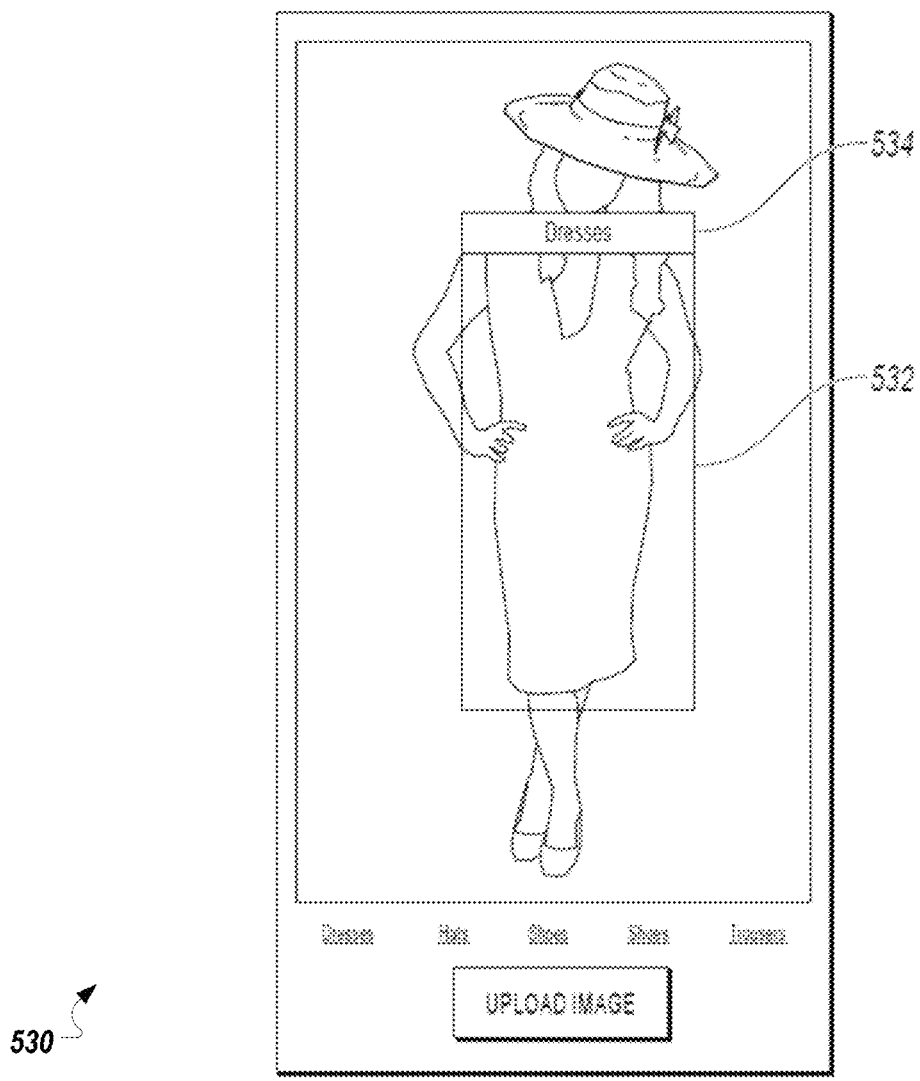
FIG. 5C illustrates another example user interface for initiating a visual search based on a selected clothing item.

FIG. 5C illustrates another example user interface 530 for initiating a visual search based on a selected clothing item. The user has selected a bounding box 532 (e.g., corresponding to the bounding box 456 of FIG. 4B) from among multiple bounding boxes that were previously displayed that each included an identified clothing item. A note 534 indicates an article type of the dress included in the bounding box 532. In response to selection of the bounding box 532 (or in response to a separate search-request input), a visual search can be requested based on the dress included in the bounding box 532.

Figure 5D:
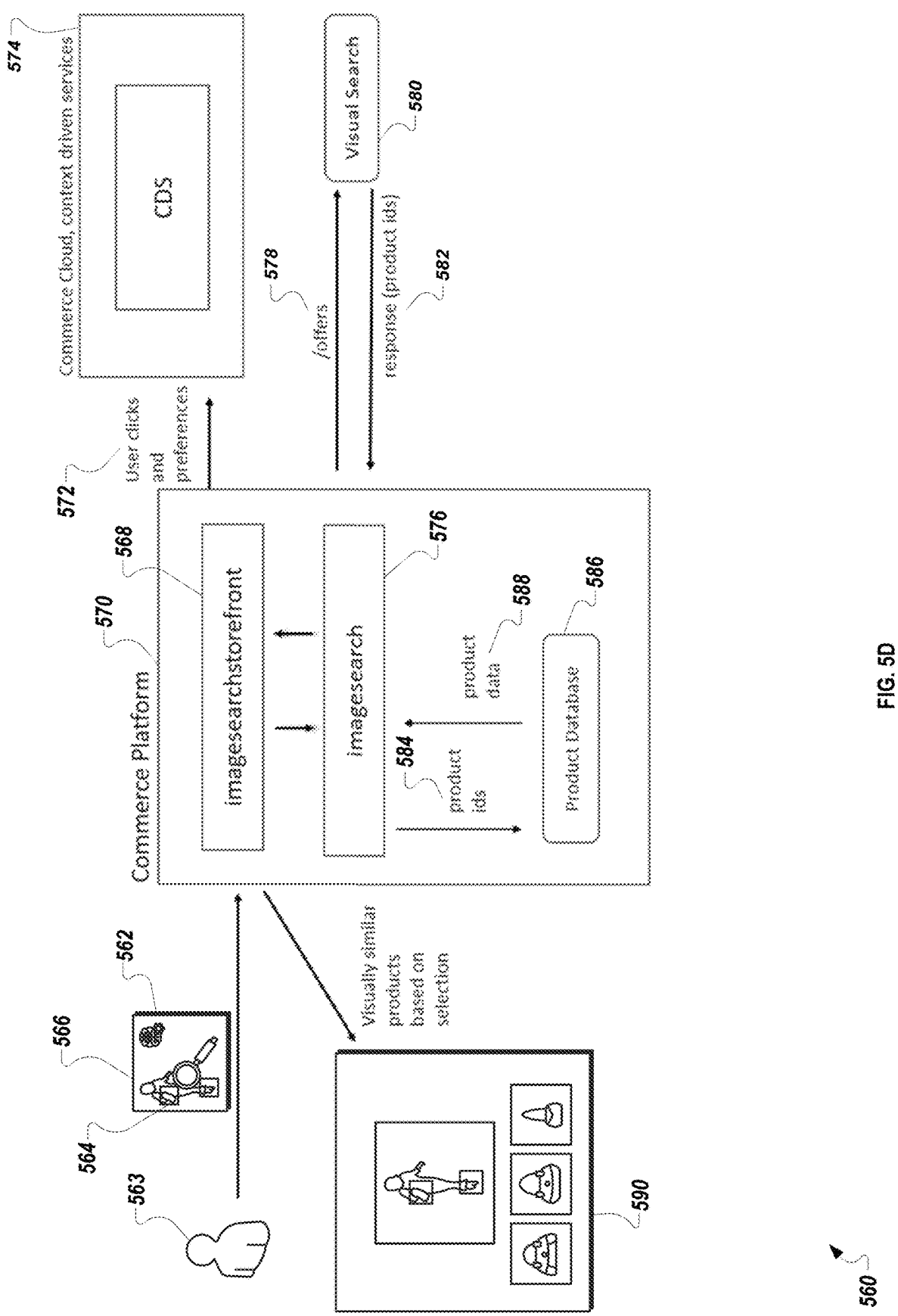
FIG. 5D illustrates an example system for performing a visual search based on a selected clothing item.

FIG. 5D illustrates an example system 560 for performing a visual search based on a selected clothing item. As shown in a conceptual image 562, a user 563 has selected a clothing item 564 (or a bounding box that includes the clothing item), on a highlighted image 566. Information about the selected clothing item is sent to an image storefront service 568 provided by a commerce platform 570. Additionally, information 572 indicating selection of the selected clothing item 564 is sent to a context driven services component 574, for updating preferences for the user 563. The information 572 can include information such as category, color, type, or style of the selected item. Stored preferences for the user 563 can be later used to select items to display to the user, for example, such as on a home page or a recommendations interface. An example instance of the information 572 is: "{SleeveStyle":["SpaghettiStrap"], "gender":["female"], "Neckline":["V"], "Length":["Midi"], "Color": ["LightPink,"], "Cat":["Dress"], "Sleeve":["Sleeveless"], "category":["Dresses"], "Texture":["Lace"]}".

The image storefront service 568 can forward information about the selected clothing item 564 to an image search service 576. The image search service 576 can send a search request 578 to a visual search engine 580, requesting a search for clothing items that match the selected clothing item 564.

The visual search engine 580 can identify matching clothing items, and send a response 582 to the image search service 576. The response 582 can include product identifiers of matching products, for example. The visual search engine 580 can access a repository of information that includes indexed clothing items indexed by features. Indexed clothing items can be indexed by features such as color, type, texture, structure, edges, material, size, and other clothing item characteristics. Features can be identified in product images and in an image provided to the visual search engine 580 using a SIFT (Scale-Invariant Feature Transform) algorithm, a Speeded-Up Robust Features (SURF) algorithm, a pyramid opponent histogram, or other approaches. Identifying matching clothing items can include identifying product images that have a feature vector that is similar to the image the user 563 has uploaded.

The image search service 576 can query a product database 586, using product identifiers 584 that correspond to (or are the same as) product identifiers in the response 582. A query result 588 from querying the product database 586 can include product data for products that have the product identifiers 584. The product data in the query result 588 can be used by the image search service 576 (or by the image storefront service 568, to create a search results page (e.g., as illustrated in a conceptual image 590).

Figure 6A:
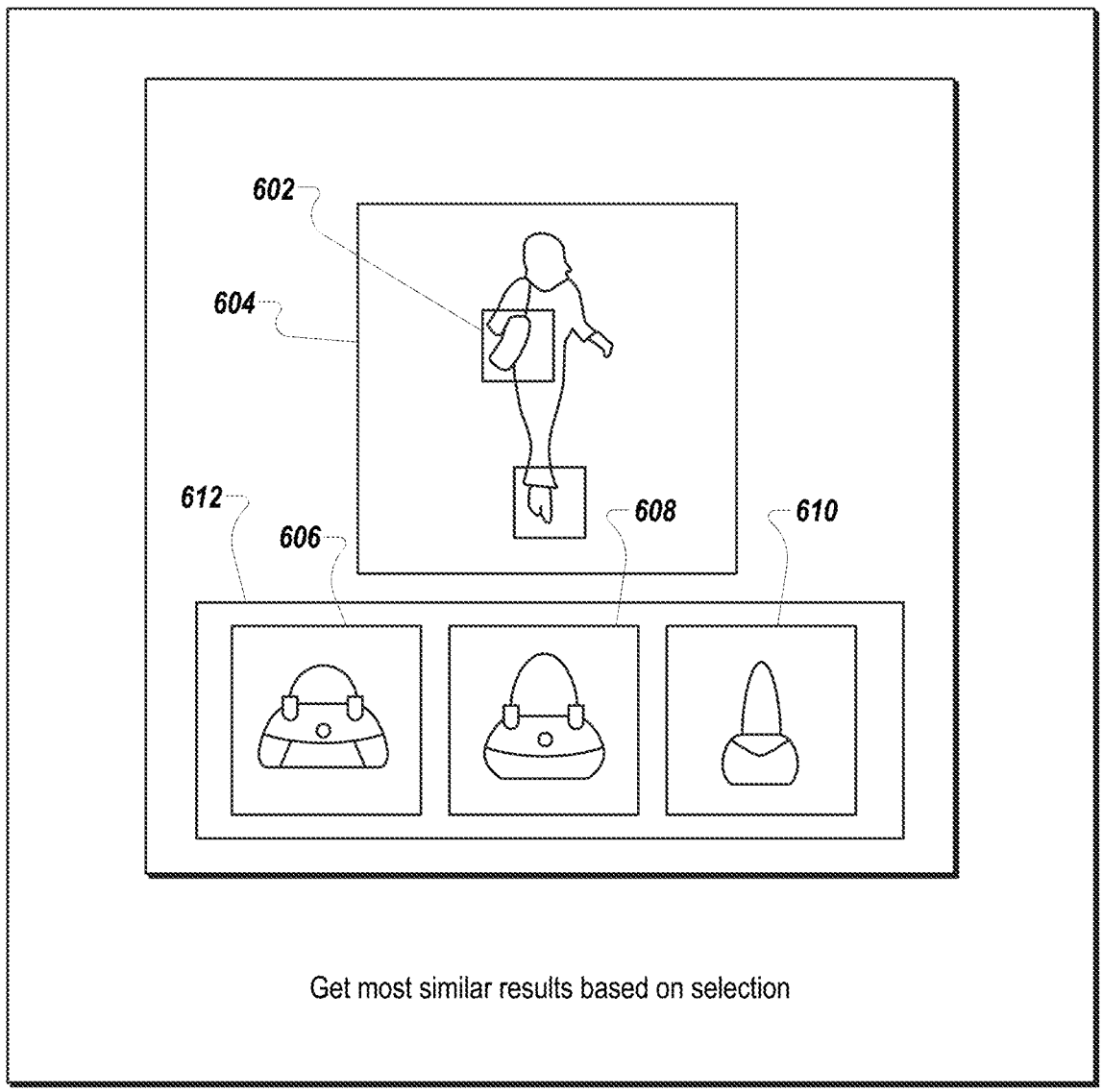
FIG. 6A is a conceptual diagram illustrating visual search results.

FIG. 6A is a conceptual diagram 600 illustrating visual search results. In response to a user selection of a clothing item 602 in a highlighted image 604, a visual search can be performed and matching items 606, 608, and 610 that are visually similar to the selected clothing item 602 can be identified and presented in a visual search results area 612. The visual search results area 612 can include, for each matching item, an item image, an item description, price information, or other product information.

Figure 6B:
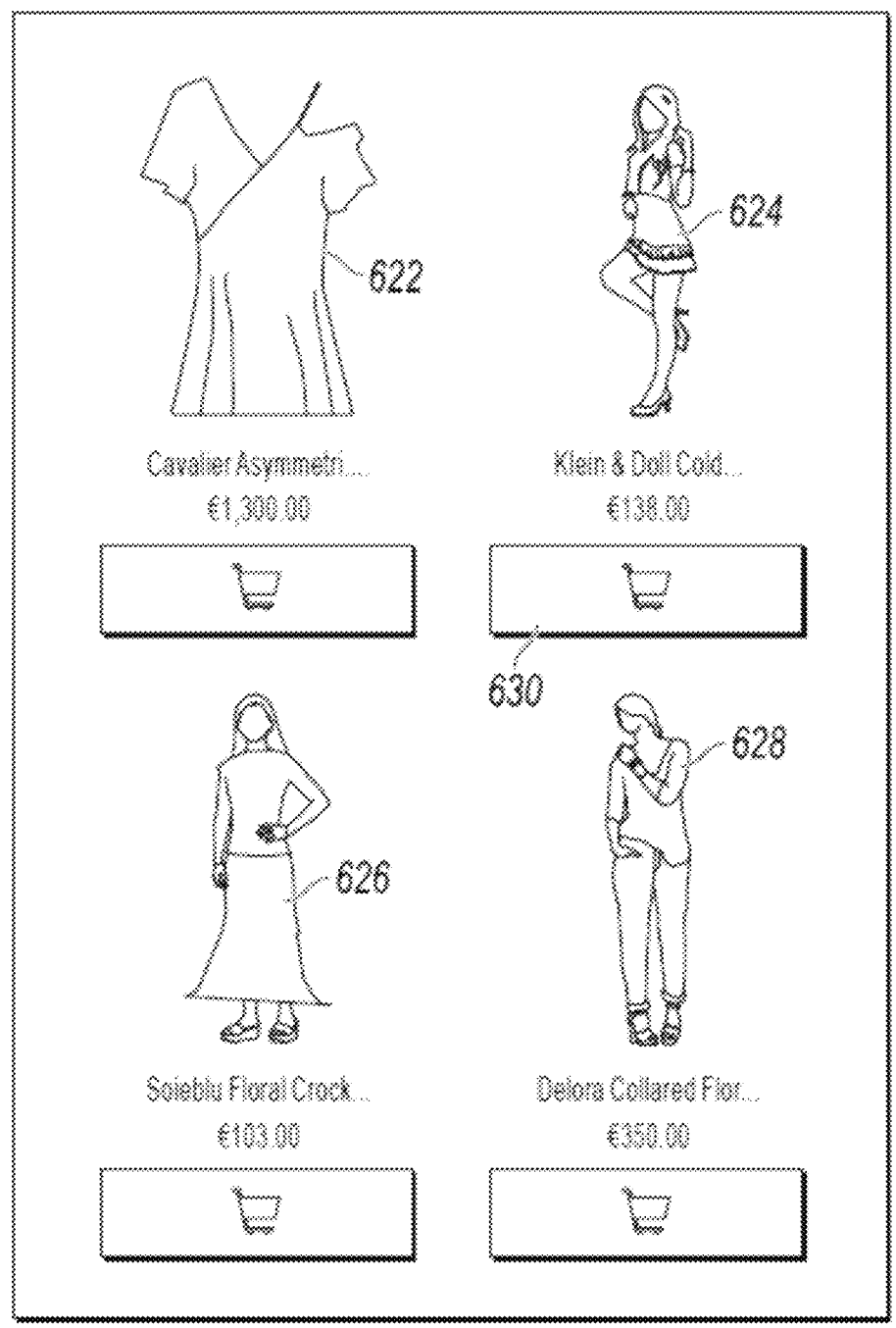
FIG. 6B illustrates an example user interface for presenting visual search results.

FIG. 6B illustrates an example user interface 620 for presenting visual search results. The user interface 620 displays dress images 622, 624, 626, and 628 of dresses that have been identified as visually similar to a previously selected item (e.g., a dress included in the selected bounding box 532 of FIG. 5D). A user can add an item corresponding to a search result to a shopping cart (e.g., by selecting an item such as an add-to-cart item 630). The user can select one of the dress images 622, 624, 626, or 628 to view a product details page for the selected dress. For example, the user can select the dress image 624. Results of a visual search can sorted by similarity level to an item used for the search, with more similar items presented before (and/or as higher priority) than less similar items.

Figure 7A:
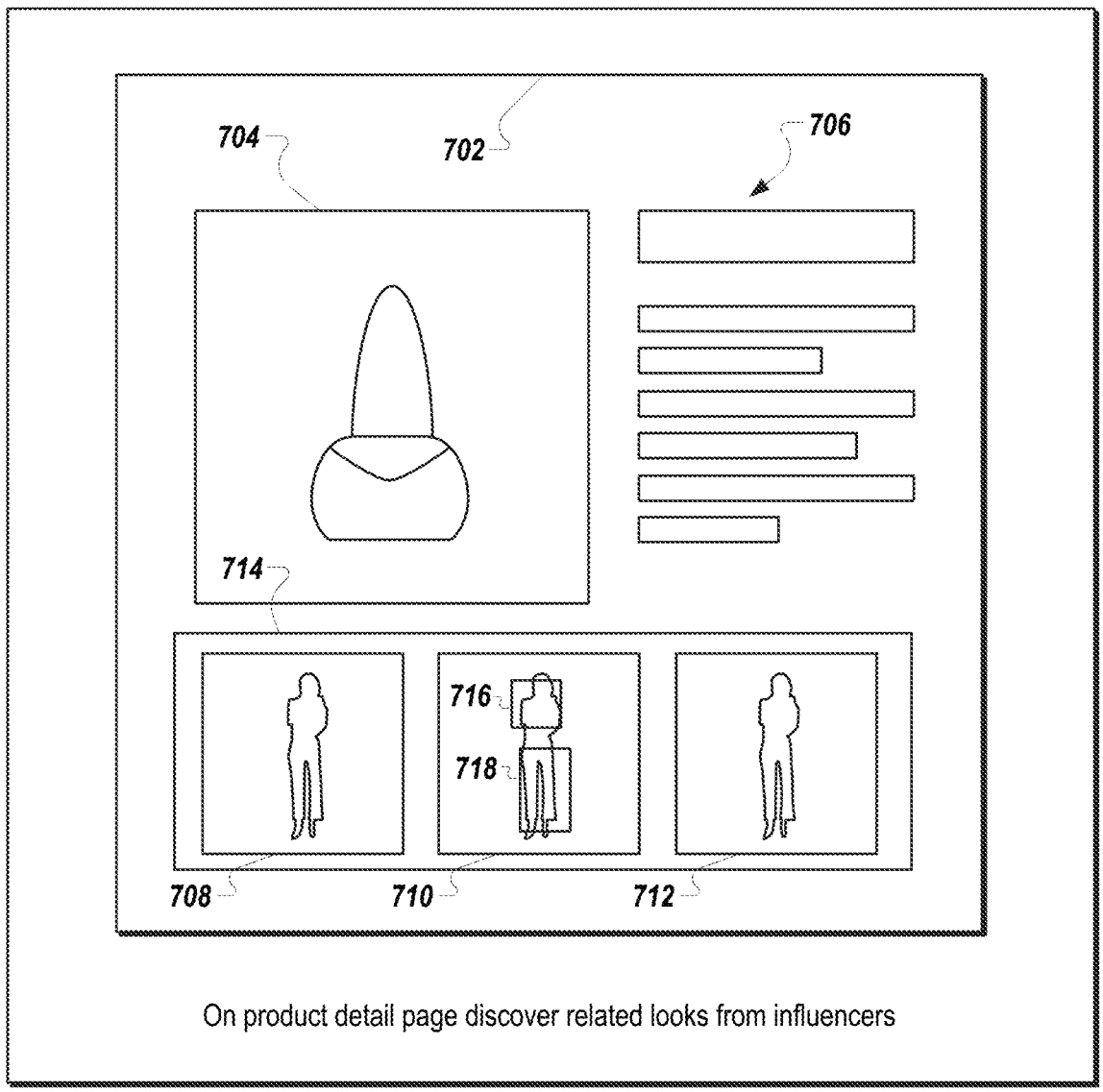
FIG. 7A is a conceptual diagram for presentation of a product details page.

FIG. 7A is a conceptual diagram 700 for presentation of a product details page. When a user selects a visual search result that corresponds to a matching item that matches a previously-selected clothing item, a product details page can be displayed. For instance, a conceptual product details page 702 can be displayed in response to selection of a matching item 704 (e.g., corresponding to the matching item 610 of FIG. 6A). Product details 706 for the matching item 704 can be displayed.

Additionally, related looks that include similar matching items can be displayed. For instance, related looks 708, 710, and 712 are displayed in a matching looks area 714. At least some of the matching looks 708, 710, and 712 can include influencers (e.g., models) who are associated with the platform. The user can view how outfits that include items similar to (or the same as) matching items from a search, for inspiration. As described below, the user can request a visual search using an image in a related look (or an entire related look image). For example, a top 716 and slacks 718 have been identified in the related look 710. The user can select the top 716 and/or the slacks 718 to request a visual search based on a respective selected item.

Figure 7B:
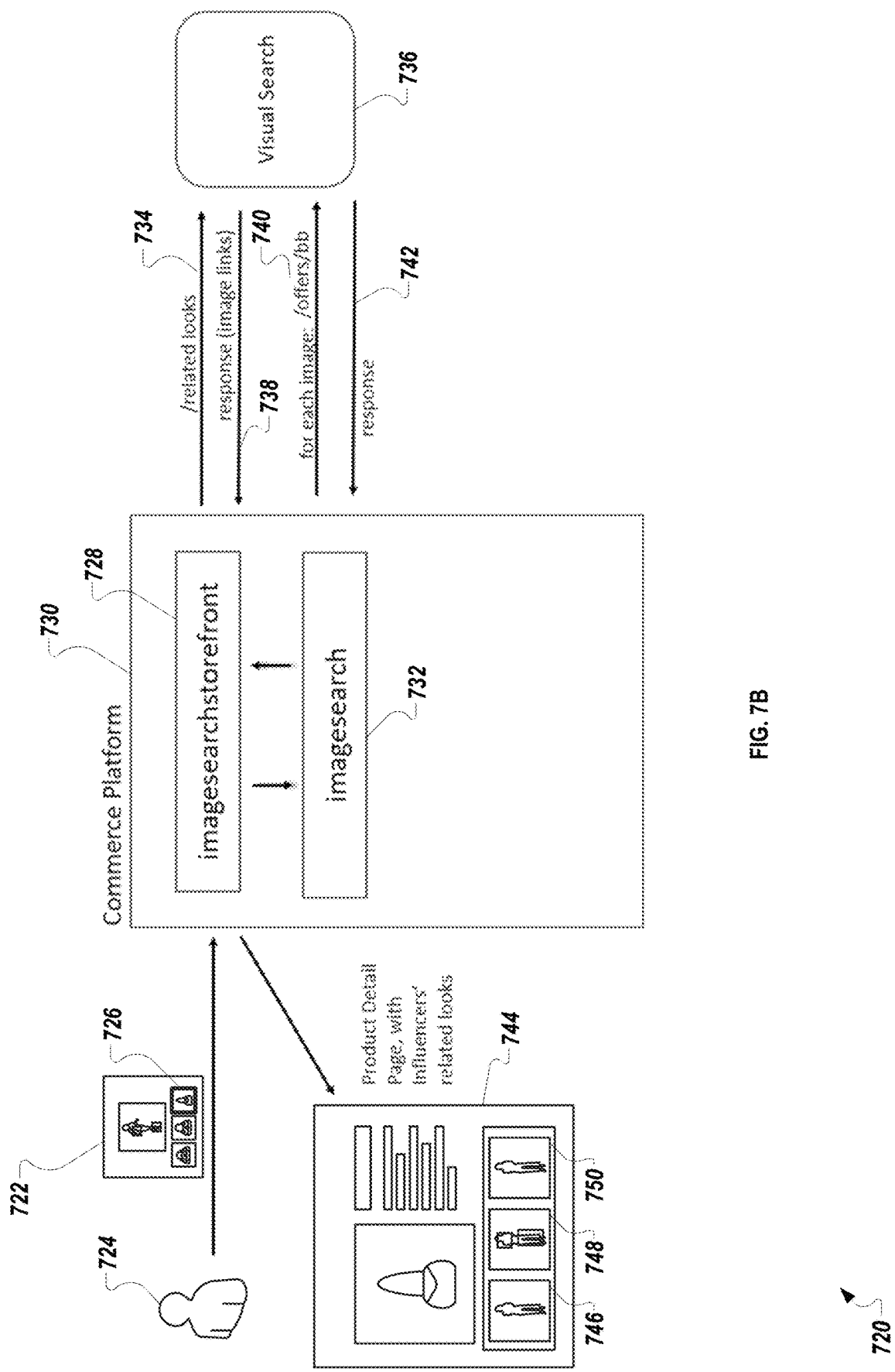
FIG. 7B illustrates an example system for generation and presentation of a product details page.

FIG. 7B illustrates an example system 720 for generation and presentation of a product details page. As shown in a conceptual image 722, a user 724 has selected a matching item search result that matches a previously-selected (or displayed) clothing item. An indication of the selected matching item is sent to an image storefront service 728 provided by a commerce platform 730. The image storefront service 728 (or an image search service 732) can send a request 734 to a visual search engine 736 for related-looks images that include an item that is visually similar to the selected matching item 726. The visual search engine can identify images that include an item that is visually similar to the selected matching item 726, and provide information about the identified images in a response 738. For example, the response 738 can include links to identified related-looks images.

The image search service 732 can, for each image identified in the response 738, send a request 740 to the visual search engine 736 to identify clothing items in the image. Each request 740 can include or link to a particular related-look image, for example. The visual search engine 736 can, for each related-look image, search for clothing items within the related-look image and send a response 742 that indicates clothing items included in the related-look image. The image search service 732 can use information in each response 742 to generate a user interface 744 that has indications (e.g., bounding boxes) of clothing items that were identified within each related-look image (e.g., related-look images 746, 748, and 749). The image search service 732 can provide the generated user interface 744 to the image storefront service 728, and the image storefront service 728 can provide the user interface 744 to a device of the user 724, for presentation on the device.

Figure 7C:
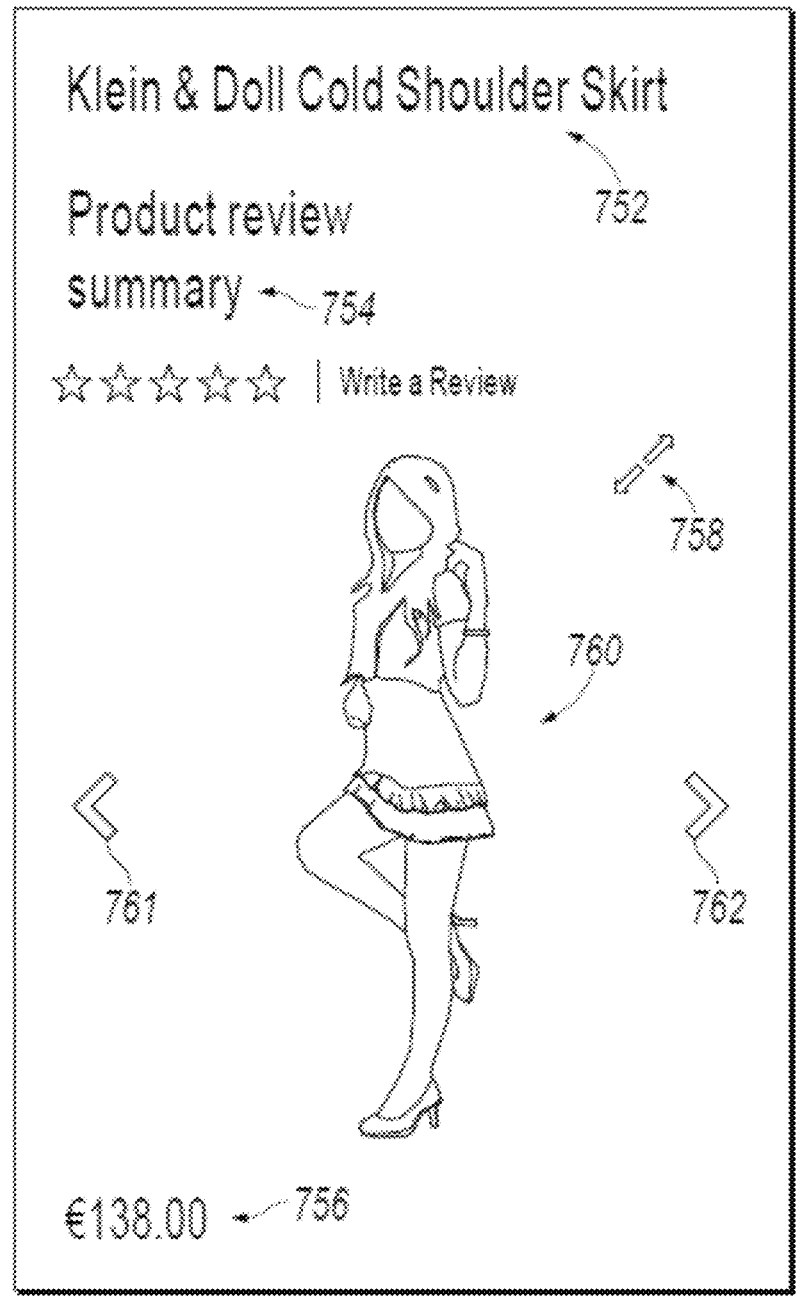
FIG. 7C illustrates an example user interface for presenting product detail information.

FIG. 7C illustrates an example user interface 750 for presenting product detail information. The user interface 750 displays product information for a dress the user selected (e.g., the dress 624 of FIG. 6B) in a visual search results interface. For example, a product name and description 752, product review information 754, and product price information 756 are displayed. An image-expand control 758 can be selected to expand an image 760 of the dress. Other images of the dress can be displayed using image navigation controls 761 and 762. Other information or controls can be displayed, such as a control that enables a user to add the dress to a shopping cart.

Figure 7D:
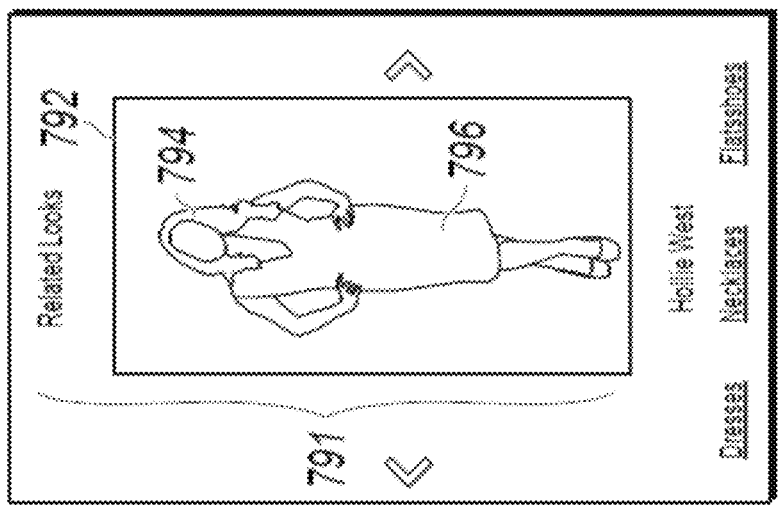
FIGS. 7D, 7E, and 7F illustrate example user interfaces for presenting related looks that include at least one item that is similar to an item a user has selected.
Figure 7E:
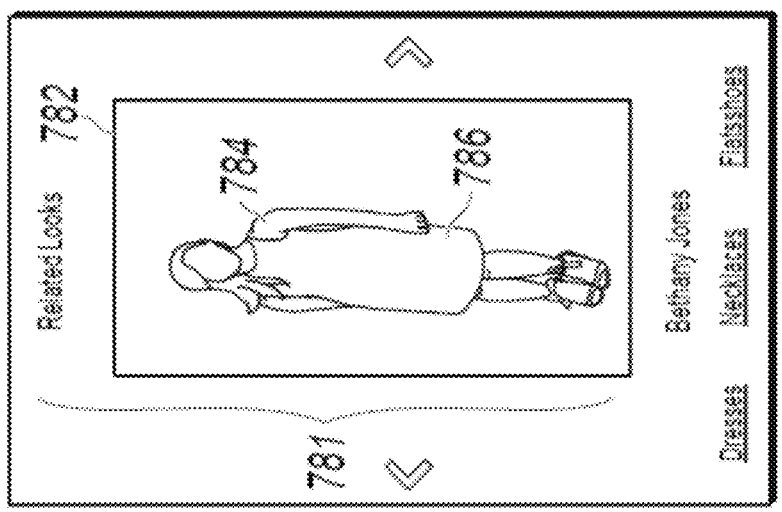
Figure 7F:
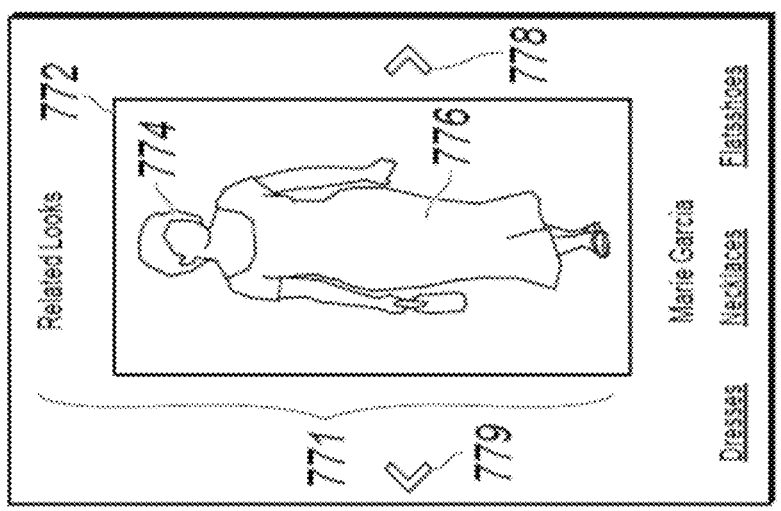

FIGS. 7D, 7E, and 7F illustrate example user interfaces 770, 780, and 790, respectively, for presenting related looks that include at least one item that is similar to an item a user has selected. In addition to visual searching and finding similar products, the system can be configured to inspire customers by showing users different options for wearing an item. For example, to inspire the user on product detail pages, fashion/style pictures from influencers, including similar products or cross sells, can be displayed on the product detail pages. Influencers (e.g., models), wearing the exact or a similar product to the one searched for (e.g., in different styles) can be displayed in order to inspire the user and show the user different possibilities of combining the product with other items. Each related look image can be analyzed, and recognized items can be highlighted, so that the user can easily visually search for other items to complete a look. Related images that have been retrieved, for example, from social platforms, can be displayed on the product details page.

For example, the user interfaces 770, 780, and 790 include related looks sections 771, 781, and 791, respectively. The related looks sections 771, 781, and 791 can be included in a product details user interface (e.g., at the bottom of the user interface 750 of FIG. 7C), or can be included in an interface that is separate from (but linked to) the product details user interface).

The user interface 770 includes a related look image 772 that includes an influencer 774 who is wearing a dress 776 that has been identified as being visually similar to the image 760 of a dress in FIG. 7C. Other related looks can be presented in response to selection of navigation controls 778 and 789.

For example, the user interface 780 includes a related look image 782 that includes an influencer 784 who is wearing a dress 786 that has been identified as being visually similar to the image 760 of FIG. 7C. Similarly, the user interface 790 includes a related look image 792 that includes an influencer 794 who is wearing a dress 796 that has been identified as being visually similar to the image 760 of FIG. 7C. The user can select a respective related look image, to request a visual search based on the related look image. For example and as described herein, clothing items can be identified in a related look image and a user can select an identified clothing item in a related look image, to request a search for the related look clothing item.

Figure 8A:
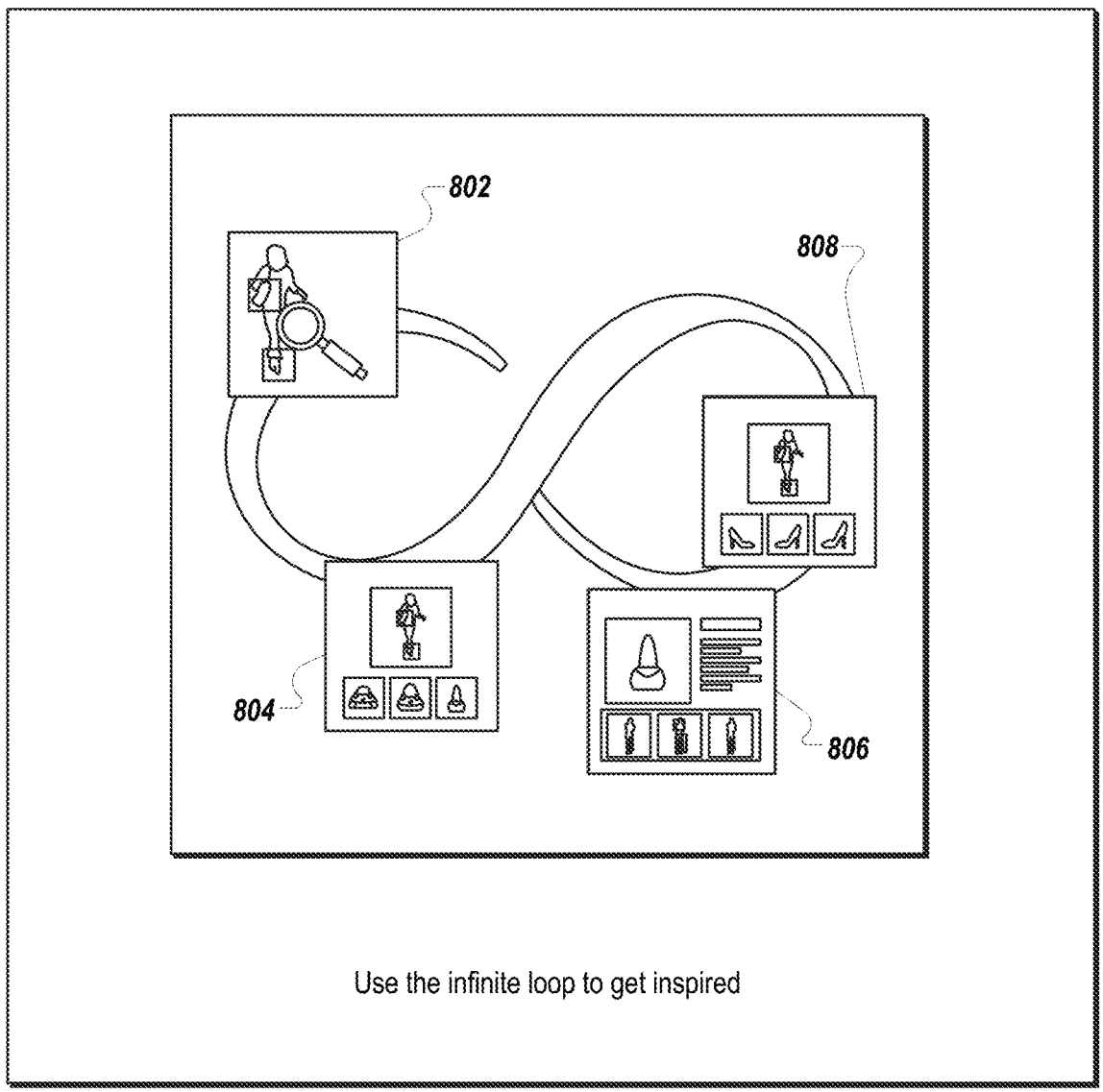
FIG. 8A is a conceptual diagram illustrating a repetitive loop potential for visual searching.

FIG. 8A is a conceptual diagram 800 illustrating a repetitive loop potential for visual searching. As described above, in addition to a user-uploaded image, influencer/similar product images can be enhanced with visual search possibilities, which can create a repetitive loop of discovery potential for a user. For instance, the user can be enabled to repeatedly search for products of interest that are similar to an uploaded, recently viewed, or related product, for inspiration on how to wear various products.

As an example, a first conceptual image 802 illustrates a first visual search, during which a user selects a clothing item in an image. A second conceptual image 804 illustrates a search result page generated from the first visual search, with selectable matching items. A third conceptual image 806 illustrates a product details page for a selected matching item that includes related looks that include a clothing item similar to the matching item. The related looks can be processed to identify items in the related looks. The user can select an identified item in a related look to perform a second visual search. A fourth conceptual image 808 illustrates items identified in a related look, including a selected item (e.g., shoes), and matching items (e.g., matching shoes) that match the selected item.

Figure 8D:
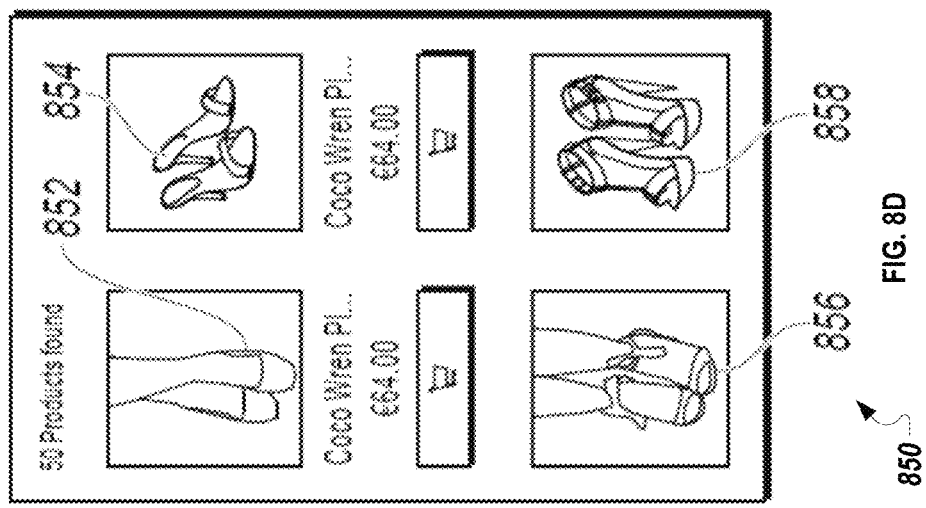
FIGS. 8B, 8C, and 8D are example user interfaces that illustrate visual searching based on a related look.
Figure 8C:
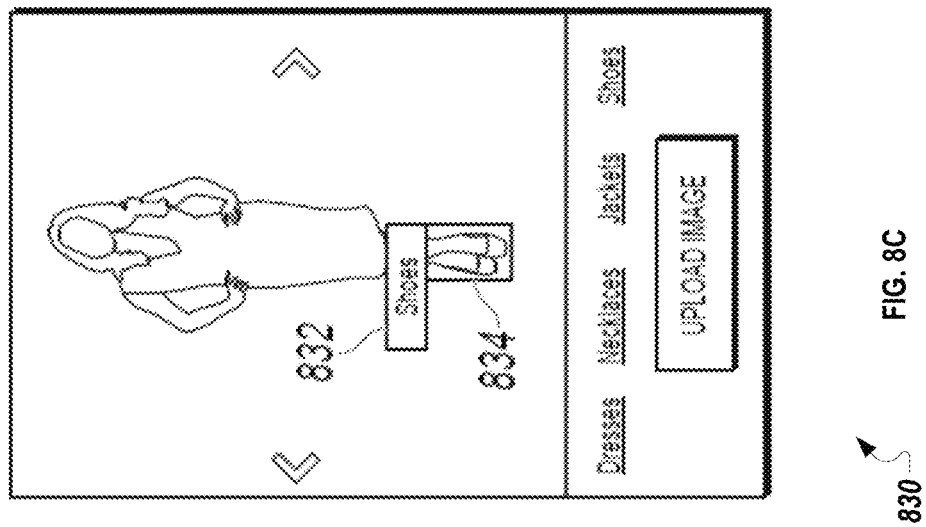
Figure 8B:
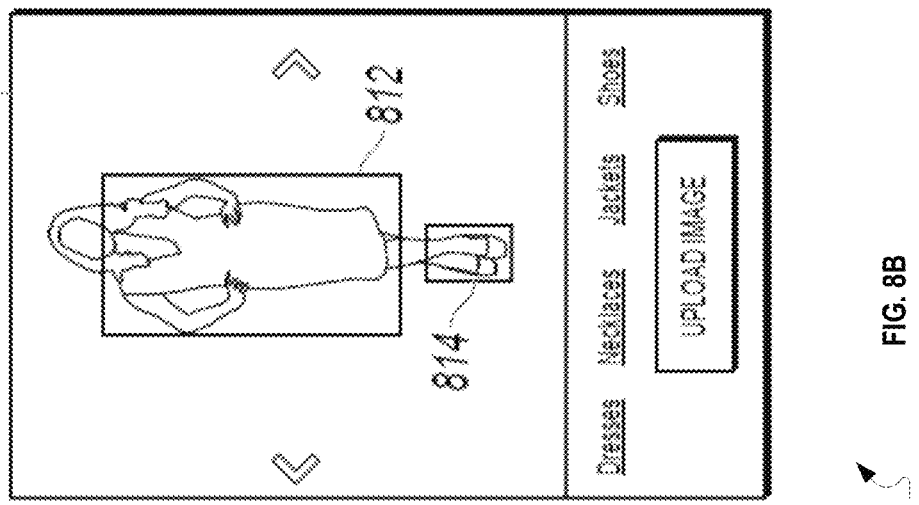

FIGS. 8B, 8C, and 8D are example user interfaces 810, 830, and 850 that illustrate visual searching based on a related look. The user interface 810 includes a highlighted related-look image 811 that includes highlights 812 and 814 (e.g., bounding boxes) of clothing items that have been identified in a related look image. The user may have requested identification of clothing items or clothing items may have been identified automatically. The user can select the highlight 812 or the highlight 814 to request a visual search for a clothing item included in the respective highlight. For example, the user can select the highlight 814 to request a visual search for shoes that are visually similar to the shoes included in the highlight 814.

For example, the user interface 830 includes an article type caption 832 (e.g., shoes) adjacent to a highlight 834 to indicate a type of selected item (and in some implementations, to indicate that the highlight 834 has been selected). The user can request a visual search based on the highlight 834, for example, by selecting the highlight 834 again, by selecting the article type caption 832, or by performing some other type of user input.

FIG. 8D illustrates search results that includes matching products 852, 854, 856, and 858 that are visually similar to the shoes included in the highlight 834. Accordingly, the user can discover items that are similar to those displayed in a related look, with the related look including an item similar to an item in which the user was initially interested.

The user can therefore discover multiple items that may be included in an overall outfit. For instance, the user may, in a first step, see a first dress (e.g., a dress on the mannequin of FIG. 4B). The user may, in a second step, perform a first visual search to find items that are visually similar to the first dress, e.g., to view visual search results that include the dress image 624 of FIG. 6B. The user may, in a third step, select a visual search result (e.g., select the dress image 624), which can result in a product details page that includes related looks. For instance, the user interface 790 of FIG. 7F, that includes the related look image 792, can be displayed. The user can, in a fourth step, perform a second visual search for an item included in the related look image (e.g., the user can perform a second visual search based on the shoes in the highlight 834). In a fifth step, the user can select the matching product 858 (e.g., matching shoes that match the shoes in the highlight 834). The fourth and fifth steps may represent a user trying to find shoes that complement the dress in the dress image 624, for example, by finding shoes that are similar to shoes that an influencer is wearing while wearing a dress that is similar to the dress in the dress image 624. Accordingly, the user can use the system to find products of interest, based on influencer styles, on recommendations, past purchases and selections, etc., with visual matching performed as appropriate.

Figure 8E:
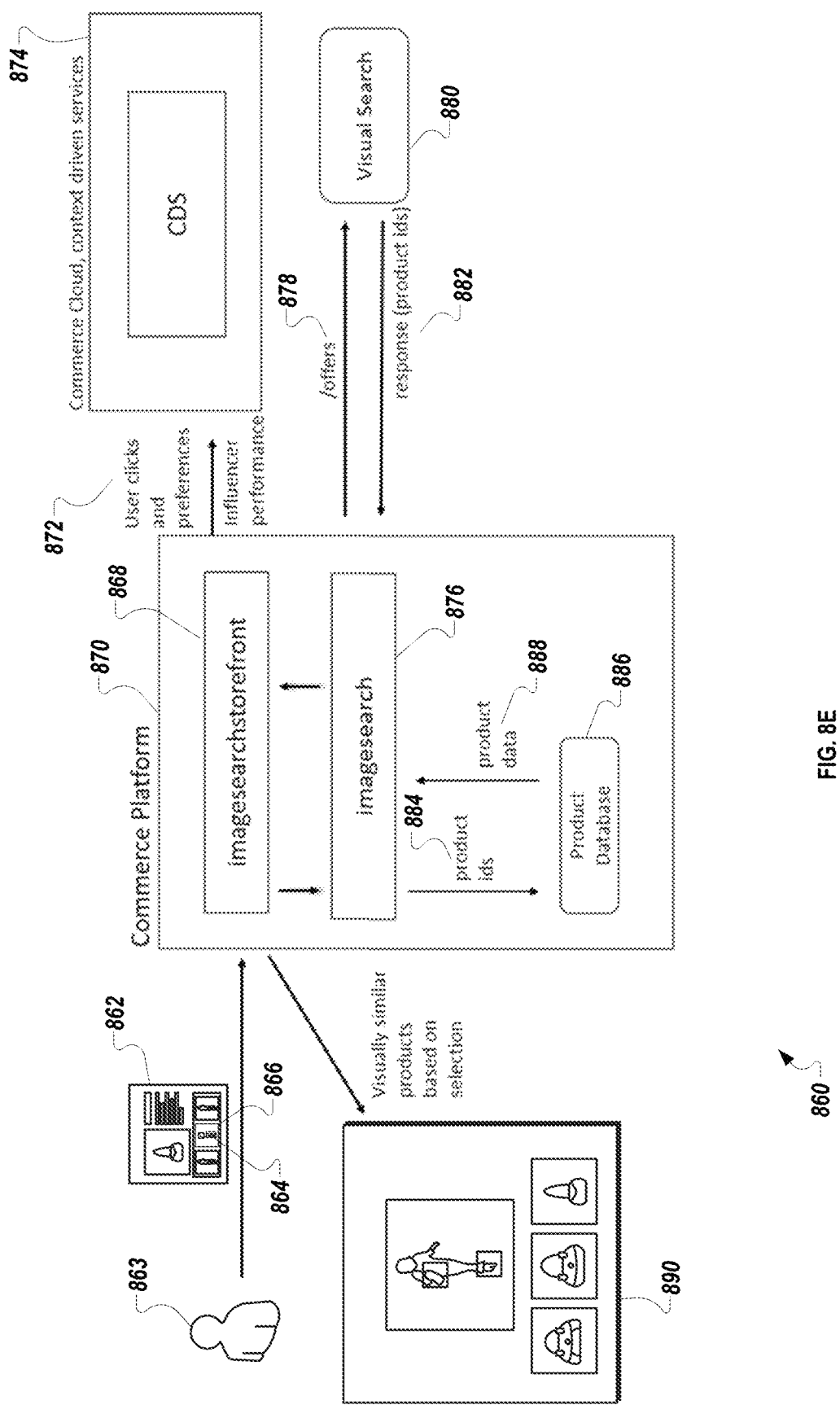
FIG. 8E illustrates an example system for performing a visual search based on a selected clothing item in a related look.

FIG. 8E illustrates an example system 860 for performing a visual search based on a selected clothing item in a related look. The system 860 is or may be similar to the system 560 of FIG. 5D. As shown in a conceptual image 862, a user 863 has selected a clothing item 864 (or a bounding box that includes the clothing item) in a related look image 866. Information about the selected clothing item 864 in the related look image 866 is sent to an image storefront service 868 provided by a commerce platform 870. Additionally, information 872 indicating selection of the selected clothing item 864 is sent to a context driven services component 874, for updating preferences for the user 863. The information 872 can include attribution information for an influencer associated with a related look item. Stored preferences for the user 863 can be later used to select items to display to the user, for example, such as on a home page or a recommendations interface. The stored preferences can indicate which influencers a user likes, which influencers a user has selected (and how often), as well as which styles or types of clothing a user appears to be interested in.

The image storefront service 868 can forward information about the selected clothing item 864 to an image search service 876. The image search service 876 can send a search request 878 to a visual search engine 880, requesting a search for clothing items that match the selected clothing item 864 in the related look image 866. The visual search engine 880 can identify matching clothing items, and send a response 882 to the image search service 876. The response 882 can include product identifiers of matching products, for example. The image search service 876 can query a product database 886, using product identifiers 884 that correspond to (or are the same as) product identifiers in the response 882. A query result 888 from querying the product database 886 can include product data for products that have the product identifiers 884. The product data in the query result 888 can be used by the image search service 876 (or by the image storefront service 868, to create a search results page that includes products that visually match the selected clothing item 864 in the related look image 866 (e.g., as illustrated in a conceptual image 890).

Figure 9A:
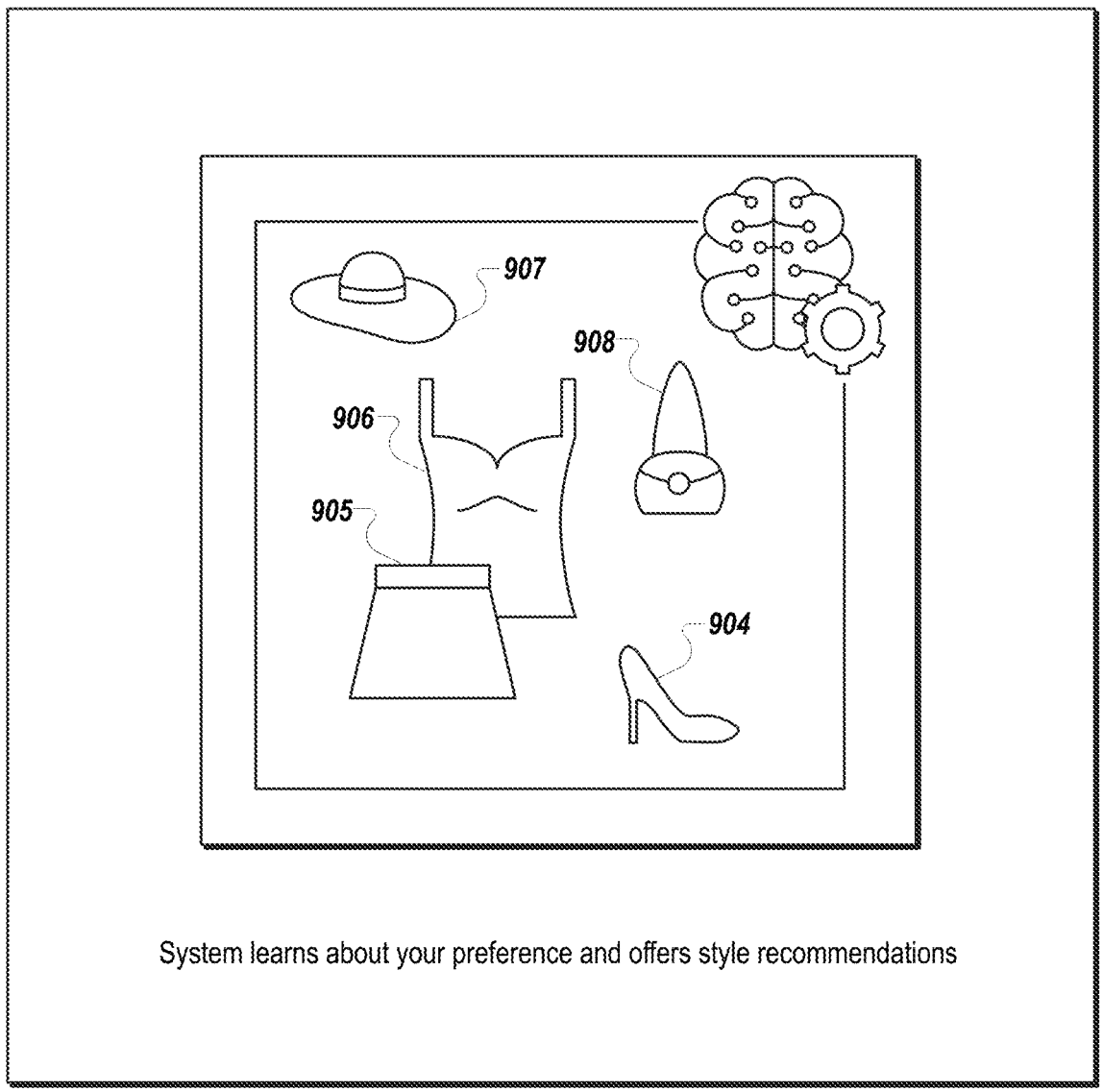
FIG. 9A is a conceptual diagram that illustrates preference-based recommendations.

FIG. 9A is a conceptual diagram 900 that illustrates preference-based recommendations. As indicated by a note 902, the system can learn about and store information for a user's preferences, based on product selections, interactions with influencer images, clothing item selections, visual searches, search result selections, etc. The system can learn about the user's preferences in terms of styles, patterns, textures, etc., and can present relevant content that matches the user's preferences. For instance, recommendations, including presentation of recommended products 904, 905, 906, 907, and 908, can be presented to a user, based on a user's stored preferences.

Figure 9B:
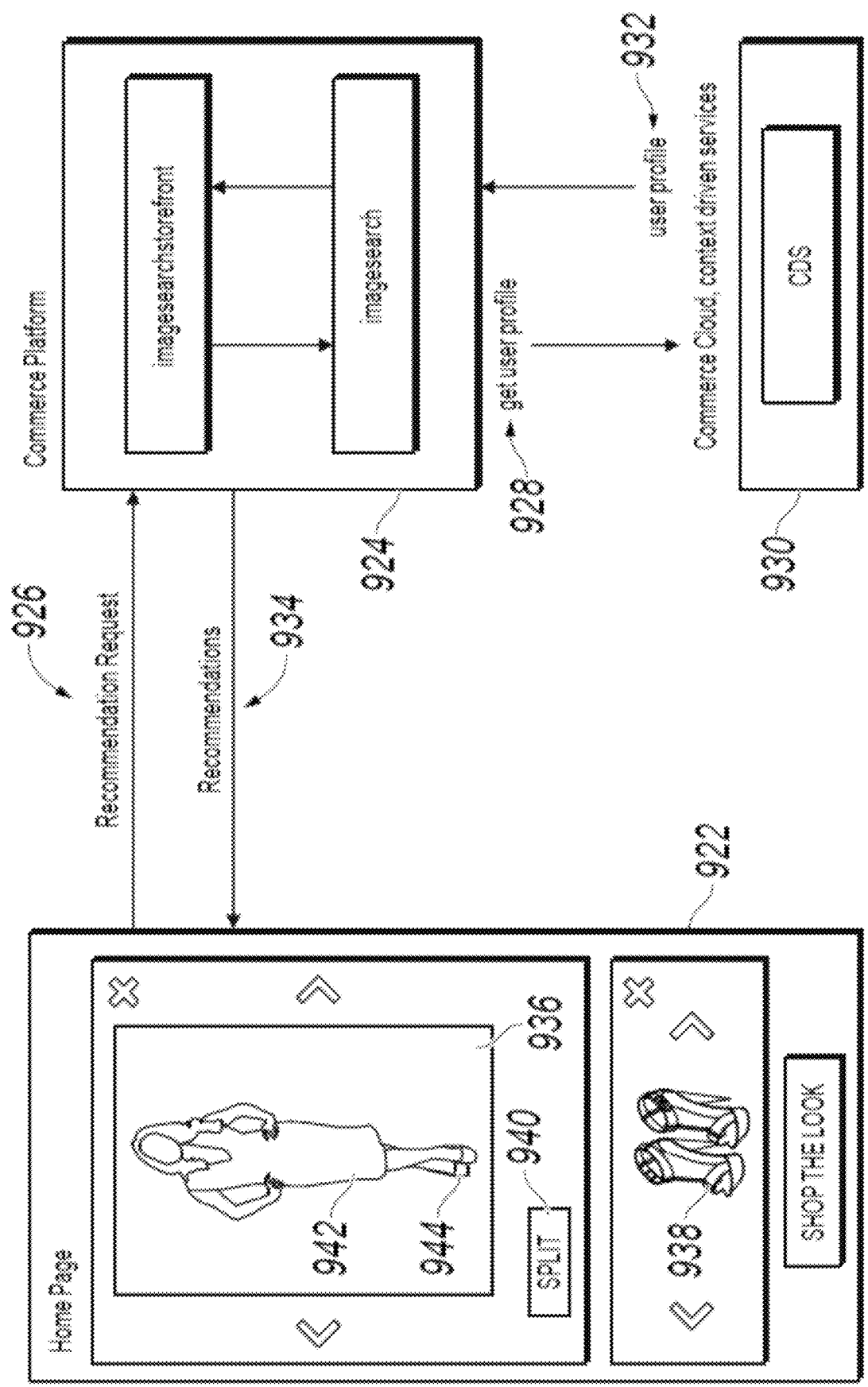
FIG. 9B illustrates an example system for presenting recommendations.

FIG. 9B illustrates an example system 920 for presenting recommendations. A user can open a store front application, for example, which can result in a request for a home page 922 of the application being sent to a commerce platform 924. The request for the home page can include a recommendation request 926 for recommendations (e.g., product recommendations) to include on the home page 922 when the home page 922 is initially displayed.

The commerce platform 924 can send a get user profile message 928 to a context driven services component 930. The get user profile message 928 can include, for example, a user identifier (e.g., that is also included in the recommendation request 926). The context driven services component 930 can retrieve user profile information and provide a user profile 932 to the commerce platform 924. The commerce platform 924 can determine recommendations (e.g., product recommendations), based on the user profile 932. The user profile 932 can include, for example, indications of past product selections, interactions with influencer images, clothing item selections, visual searches, search result selection, etc. The commerce platform 924 can generate presentable recommendations 934 that can be included in the home page 922. The presentable recommendations 934 can be sent to the user device (e.g., in a generated home page 922 or as information that can be inserted into the home page 922). For instance, the home page 922 can include a first image 936 of an outfit that includes recommended product(s) and a second image 938 of another recommended product.

In some implementations, when an outfit is displayed, a split button 940 is presented that, when selected, results in separate selectable product images being displayed (e.g., for a dress 942 and shoes 944). When separate images (e.g., for top/bottom portions of an outfit) are presented, a "join" button can be displayed that, when selected, can result in a display of a single outfit image that includes both the top and bottom portions. In some implementations, carousels of relevant products are presented, which can enable the user to choose and shop an entire look. Carousels can represent the following sections: head (e.g., with products from hats category), upper body (e.g., t-shirt), lower body (e.g., trousers, shorts) and shoes.

Figure 10B:
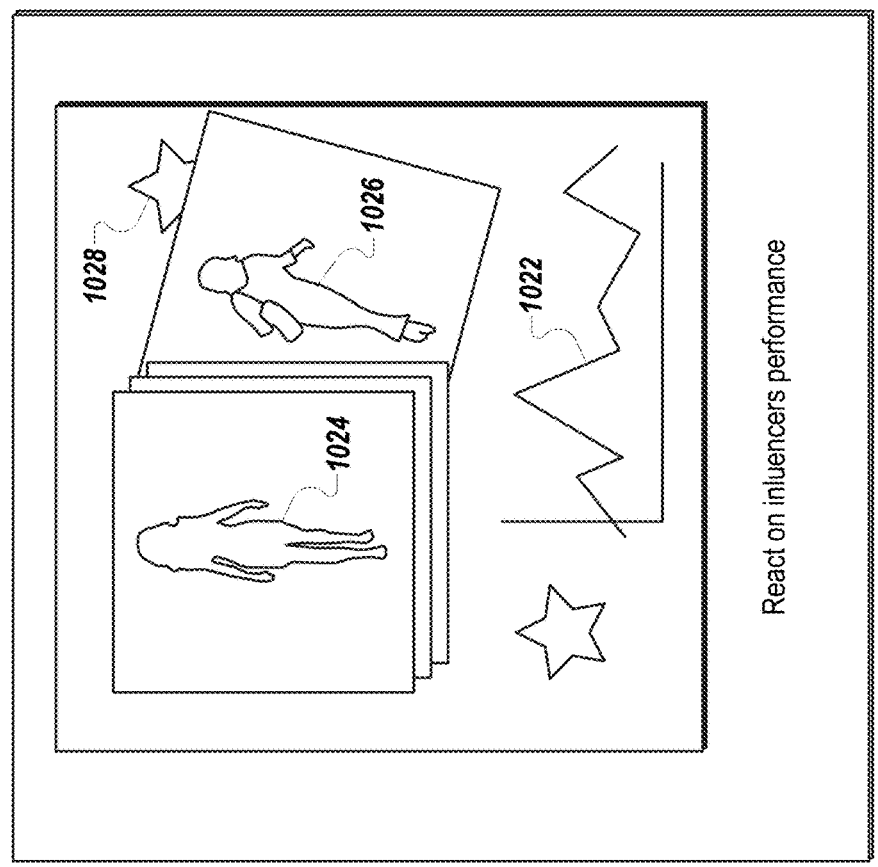
FIG. 10B is a conceptual diagram that illustrates responding to influencer performance.
Figure 10A:
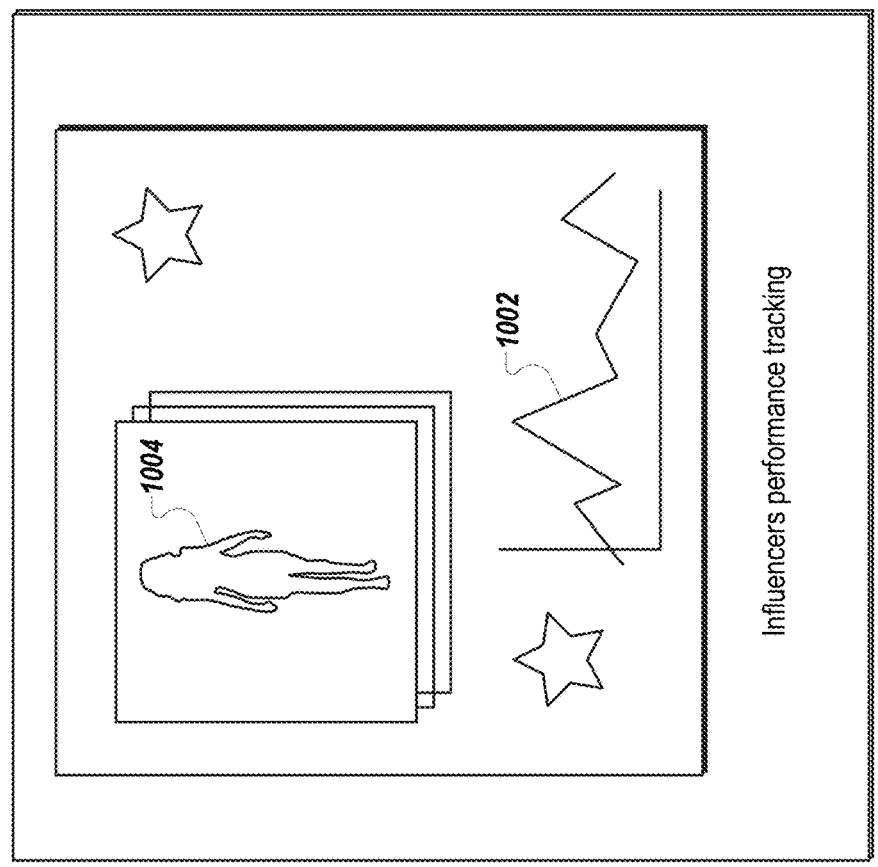
FIG. 10A is a conceptual diagram that illustrates performance tracking for influencers.

FIG. 10A is a conceptual diagram 1000 that illustrates performance tracking for influencers. As indicated by a graph 1002, various metrics can be tracked for influencers 1004 in the platform. Metrics can be related to selections, clicks, revenue, etc. Influencer tracking is discussed in more detail below.

FIG. 10B is a conceptual diagram 1020 that illustrates responding to influencer performance. As mentioned and as illustrated by a graph 1022, metrics can be gathered for influencers 1024 in a system. The system can be configured to respond to influencer performance. For instance, top influencer(s) 1026 can be determined and recognized (and possibly rewarded). Top influencers 1026 can be tagged as such in user interfaces (e.g., with a symbol 1028), and can therefore increase their own brand. As another example, if there is a need for a marketer to promote a clothing item, the marketer can access influencer performance information (e.g., using a dashboard, as described below), to determine top influencers who may be a good fit for promoting the clothing item. The marketer can contact the influencer for cooperation with a campaign, for example. As yet another example, in some implementations, influencers can access their own influencer performance information, to discover how well they are performing as compared to other influencers.

Figure 10C:
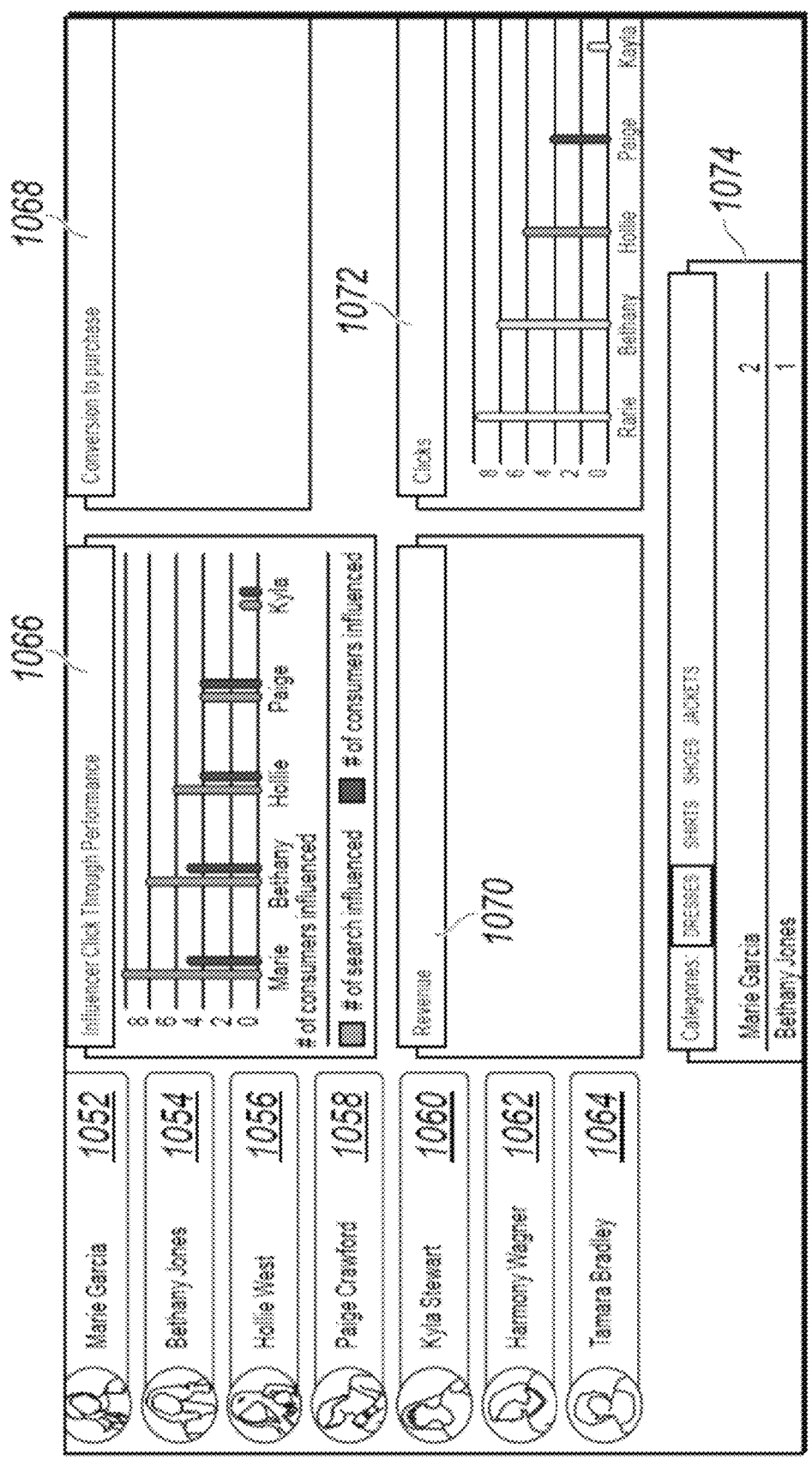
FIG. 10C illustrates an example influencer tracking dashboard.

FIG. 10C illustrates an example influencer tracking dashboard 1050. The influencer tracking dashboard 1050 can display influencer performance by different metrics. For example, metrics can be displayed for influencers 1052, 1054, 1056, 1058, 1060, 1062, and 1064. For instance, a first area 1066 shows metrics for click-through performance (e.g., a rate of click throughs when a related look of an influencer is displayed (e.g., on a product details page). A second area 1068 can display metrics for conversion rates. A third area 1070 can display metrics related to revenue (e.g., how much each influencer contributed to brand revenue). A fourth area 1072 can display click count metrics. A fifth area 1074 can display metrics for specific clothing item categories for specific influencers. The influencer tracking dashboard can enable both influencers and marketers to discover how much each influencer contributed, which can enable corresponding reactions.

Figure 11A:
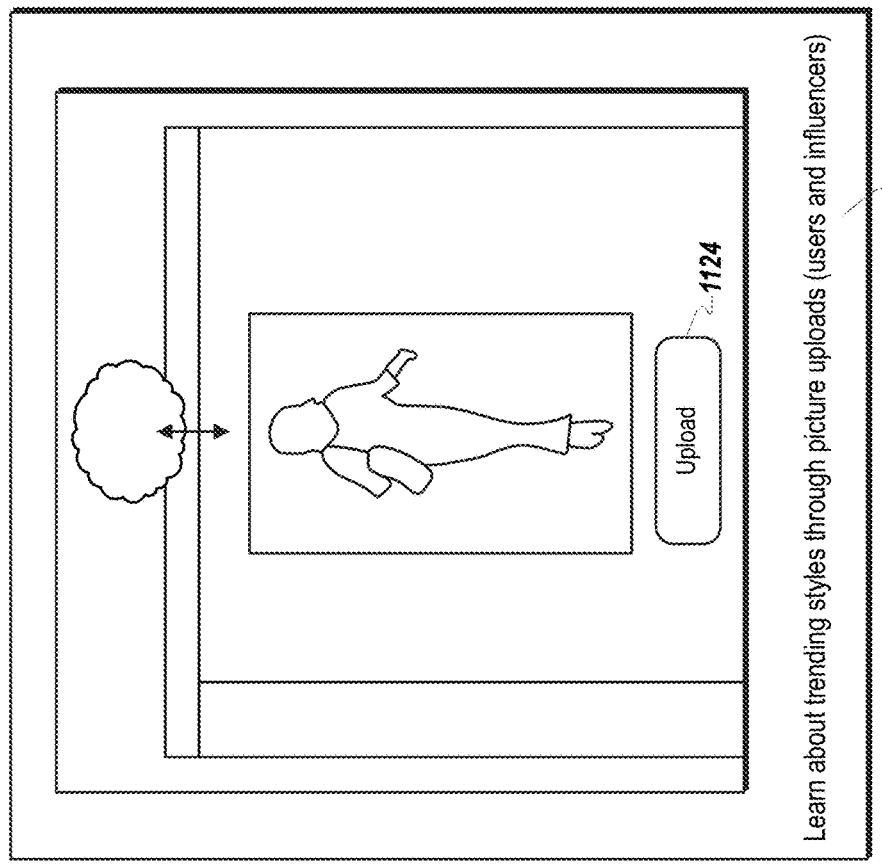
FIG. 11A is a conceptual diagram that illustrates campaign customizations.

FIG. 11A is a conceptual diagram 1100 that illustrates campaign customizations. As indicated by a note 1102, campaigns can be individualized (e.g., for a particular user 1104), to increase customer loyalty and shopping cart value. Campaigns can be created to increase user engagement with and/or generate revenue for a brand. Campaigns can include digital marketing using products that match stored user preferences. For example, for "New Arrivals" or "Christmas Sale" campaigns, products marked by a campaign engine that match preferences for the user 1104 can be included in campaign promotions provided to the user 1104 (e.g., where the marked products are selected from a broader catalog of products associated with the brand).

Figure 11B:
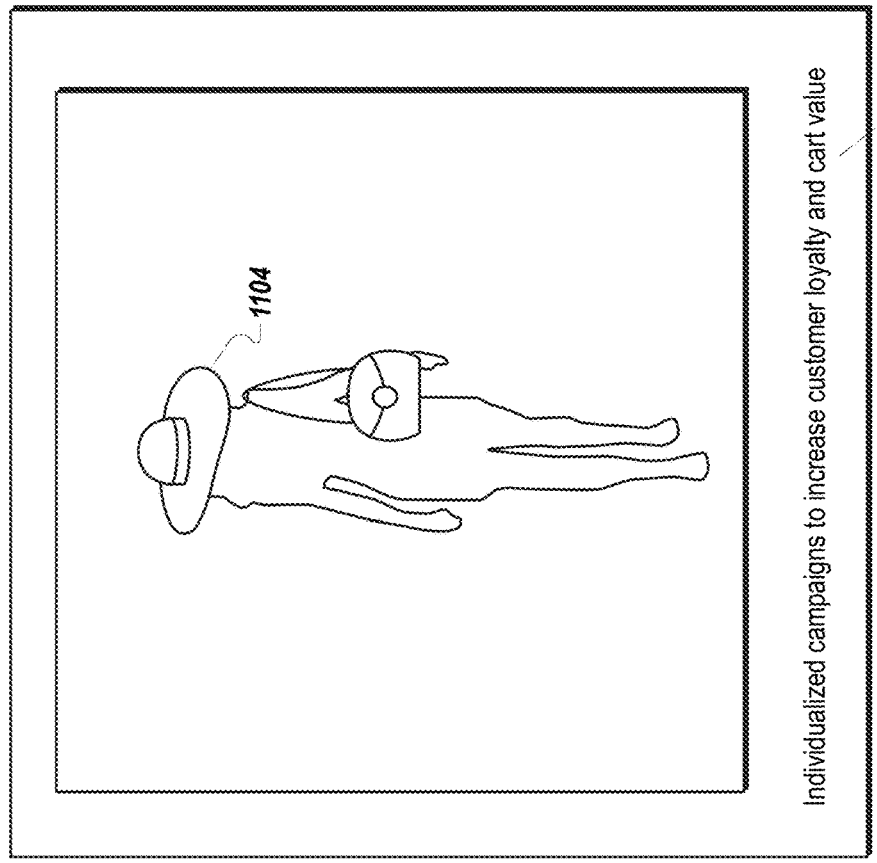
FIG. 11B is a conceptual diagram that illustrates trend determination.

FIG. 11B is a conceptual diagram 1120 that illustrates trend determination. As indicated by a note 1122, the system can learn about trending styles based on user uploads, from customer users and influencer users. Each time a user uploads an image to the system (e.g., using an upload feature 1124 of a system-provided interface), information can be stored regarding the uploaded image and subsequent actions (e.g., visual searches) performed for the image. Stored data can be analyzed, to identify trends in products of interest, styles, influencer affinity, etc. By leveraging context driven services, the system can discover current trends from overall customer interactions and curate sets/looks that are trending, which can increase shopping cart size and revenue for brands.

Figure 12:
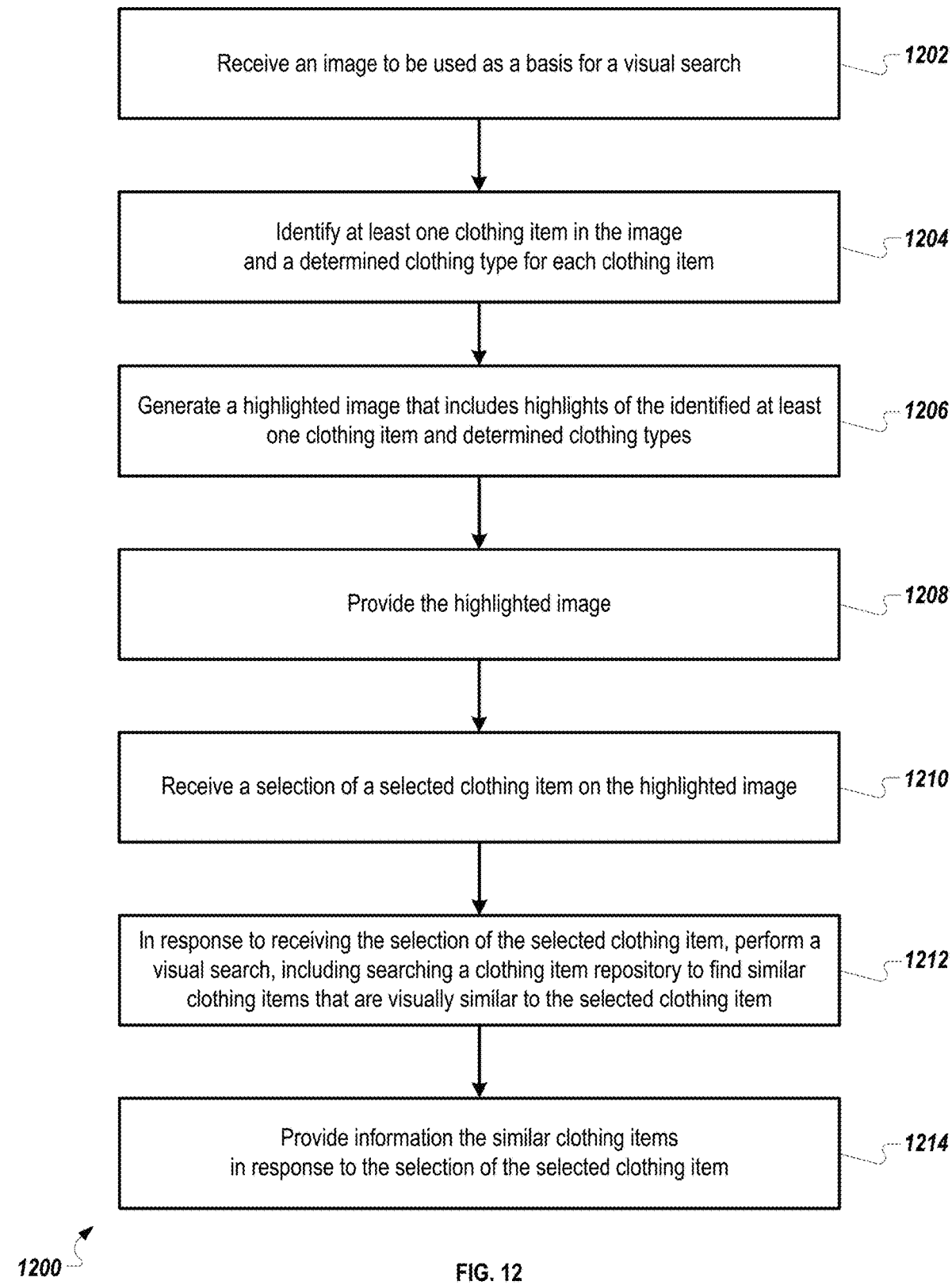
FIG. 12 is a flowchart of an example method for visual search, discovery, and attribution in e-commerce systems.

FIG. 12 is a flowchart of an example method 1200 for visual search, discovery, and attribution in e-commerce systems. It will be understood that method 1200 and related methods may be performed, for example, by any suitable system, environment, software, and hardware, or a combination of systems, environments, software, and hardware, as appropriate. For example, one or more of a client, a server, or other computing device can be used to execute method 1200 and related methods and obtain any data from the memory of a client, the server, or the other computing device. In some implementations, the method 1200 and related methods are executed by one or more components of the system 100 described above with respect to FIG. 1. For example, the method 1200 and related methods can be executed by the server 102 of FIG. 1.

At 1202, an image to be used as a basis for a visual search is received. The image can be an image of a clothing item, an image of an outfit that includes multiple clothing items, etc.

At 1204, at least one clothing item in the image and a determined clothing type for each clothing item are identified. When the image is an image of an outfit, each clothing in the outfit can be identified.

At 1206, a highlighted image is generated that includes highlights of the identified at least one clothing item and determined clothing types. Highlights can be bounding box(es), for example, that outline the identified clothing item(s). Highlights can be user-selectable.

At 1208, the highlighted image is provided. For example, the highlighted image can be provided for presentation in a user interface on a device from which the image is received.

At 1210, a selection of a selected clothing item on the highlighted image is received. For example, the user can select a selectable highlight that outlines the selected clothing item.

At 1212, in response to receiving the selection of the selected clothing item, a visual search is performed. The visual search can include searching a clothing item repository to find similar clothing items that are visually similar to the selected clothing item. At least one search parameter can be received with the selection of the selected clothing item and the search parameter(s) can be used to configure the visual searching of the clothing item repository. The at least one search parameter can include a first parameter that specifies searching for items in a same category as the selected clothing item. As another example, the at least one search parameter can include a second parameter that specifies searching for items that have a same color and pattern as the selected clothing item.

At 1214, information is provided for the similar clothing items in response to the selection of the selected clothing item. The information for the similar clothing items can be provided as visual search results. A visual search result can be selected, which can result in product information for the visual search result being displayed. Related look images can be displayed, which can be displayed with highlights of identified clothing items, which can be selected to perform other visual searches.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving, from a user computing device, an image to be used as a basis for a computer-implemented visual search;
   identifying, by a server, using a first computer-implemented visual search, at least one clothing item in the image and a determined clothing type for each clothing item;
   generating, by the server, a highlighted image that includes highlights of the identified at least one clothing item and the determined clothing type for each clothing item;

providing the highlighted image to the user computing device;
receiving, from the user computing device, a selection of a selected clothing item on the highlighted image;
in response to receiving the selection of the selected clothing item from the user computing device, performing a second computer-implemented visual search, including searching a clothing item repository to find similar clothing items that are visually similar to the selected clothing item, wherein at least one or more of the similar clothing items include at least one currently-offered product offered by an entity, and wherein the computer-implemented visual search includes comparing features of the at least one currently-offered product to features of the at least one clothing item;
providing information for the similar clothing items to the user computing device in response to the selection of the selected clothing item;
determining at least one feature variation to at least one currently-offered product feature based on the comparing features of the at least one currently-offered product to features of the at least one clothing item;
generating a recommendation for at least one new product as a variation of a currently-offered product, based on the determined at least one feature variation; and
providing, to the entity, the recommendation for the at least one new product.

2. The method of claim 1, wherein the image includes multiple clothing items in an outfit and each clothing item in the outfit is identified.

3. The method of claim 1, further comprising receiving at least one search parameter with the selection of the selected clothing item and using the at least one search parameter to configure the visual searching of the clothing item repository.

4. The method of claim 3, wherein the at least one search parameter includes a first parameter that specifies searching for items in a same category as the selected clothing item.

5. The method of claim 3, wherein the at least one search parameter includes a second parameter that specifies searching for items that have a same color and pattern as the selected clothing item.

6. The method of claim 1, wherein providing information for the similar clothing items comprises presenting the information for the similar clothing items as visual search results and wherein the method further comprises receiving selection of a first visual search result corresponding to a first similar clothing item.

7. The method of claim 6, further comprising, in response to receiving selection of the first visual search result:
identifying product information for the first similar clothing item; and
providing the identified product information.

8. The method of claim 7, further comprising, in response to selection of the first visual search result, automatically identifying at least one related look image that includes a related look clothing item that is similar to the first similar clothing item.

9. The method of claim 8, further comprising, for each related look image:
identifying clothing items in the related look image;
generating a highlighted related look image that includes highlights of the identified clothing items; and
providing the highlighted related look image.

10. The method of claim 9, further comprising:
receiving a selection of a selected related look clothing item on the highlighted related look image;
in response to receiving the selection of the selected related look clothing item, performing a second visual search, including searching a clothing item repository to find second similar clothing items that are visually similar to the selected related look clothing item; and
providing information for the second similar clothing items in response to the selection of the selected related look clothing item.

11. The method of claim 8, wherein the related look is displayed in association with a product influencer.

12. The method of claim 11, further comprising providing a dashboard user interface that displays metrics for effects of product influencers on performance of campaigns.

13. The method of claim 7, further comprising storing information a user profile that indicates selection of the selected clothing item and the first visual search result.

14. The method of claim 13, further comprising:
generating at least one product recommendation based on the user profile; and
providing the at least one product recommendation to a user associated with the user profile.

15. A system comprising:
one or more computers; and
a computer-readable medium coupled to the one or more computers having instructions stored thereon which, when executed by the one or more computers, cause the one or more computers to perform operations comprising:
receiving, from a user computing device, an image to be used as a basis for a computer-implemented visual search;
identifying, using a first computer-implemented visual search, at least one clothing item in the image and a determined clothing type for each clothing item;
generating a highlighted image that includes highlights of the identified at least one clothing item and the determined clothing type for each clothing item;
providing the highlighted image to the user computing device;
receiving, from the user computing device, a selection of a selected clothing item on the highlighted image;
in response to receiving the selection of the selected clothing item from the user computing device, performing a second computer-implemented visual search, including searching a clothing item repository to find similar clothing items that are visually similar to the selected clothing item, wherein at least one or more of the similar clothing items include at least one currently-offered product offered by an entity, and wherein the computer-implemented visual search includes comparing features of the at least one currently-offered product to features of the at least one clothing item;
providing information for the similar clothing items to the user computing device in response to the selection of the selected clothing item;
determining at least one feature variation to at least one currently-offered product feature based on the comparing features of the at least one currently-offered product to features of the at least one clothing item;
generating a recommendation for at least one new product as a variation of a currently-offered product, based on the determined at least one feature variation; and
providing, to the entity, the recommendation for the at least one new product.

16. The system of claim 15, wherein the image includes multiple clothing items in an outfit and each clothing item in the outfit is identified.

17. The system of claim 15, wherein the operations further comprise receiving at least one search parameter with the selection of the selected clothing item and using the at least one search parameter to configure the visual searching of the clothing item repository.

18. A computer program product encoded on a non-transitory storage medium, the product comprising non-transitory, computer readable instructions for causing one or more processors to perform operations comprising:
- receiving, from a user computing device, an image to be used as a basis for a computer-implemented visual search;
- identifying, using a first computer-implemented visual search, at least one clothing item in the image and a determined clothing type for each clothing item;
- generating a highlighted image that includes highlights of the identified at least one clothing item and the determined clothing type for each clothing item;
- providing the highlighted image to the user computing device;
- receiving, from the user computing device, a selection of a selected clothing item on the highlighted image;
- in response to receiving the selection of the selected clothing item from the user computing device, performing a second computer-implemented visual search, including searching a clothing item repository to find similar clothing items that are visually similar to the selected clothing item, wherein at least one or more of the similar clothing items include at least one currently-offered product offered by an entity, and wherein the computer-implemented visual search includes comparing features of the at least one currently-offered product to features of the at least one clothing item;
- providing information for the similar clothing items to the user computing device in response to the selection of the selected clothing item;
- determining at least one feature variation to at least one currently-offered product feature based on the comparing features of the at least one currently-offered product to features of the at least one clothing item;
- generating a recommendation for at least one new product as a variation of a currently-offered product, based on the determined at least one feature variation; and
- providing, to the entity, the recommendation for the at least one new product.

19. The computer program product of claim 18, wherein the image includes multiple clothing items in an outfit and each clothing item in the outfit is identified.

20. The computer program product of claim 18, wherein the operations further comprise receiving at least one search parameter with the selection of the selected clothing item and using the at least one search parameter to configure the computer-implemented visual searching of the clothing item repository.

* * * * *